United States Patent
Brunet et al.

(10) Patent No.: US 9,442,246 B2
(45) Date of Patent: Sep. 13, 2016

(54) SYSTEM AND METHOD FOR OPTICAL FIBER

(71) Applicant: Futurewei Technologies, Inc., Plano, TX (US)

(72) Inventors: Charles Brunet, Quebec (CA); Leslie Rusch, Quebec (CA)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/514,193

(22) Filed: Oct. 14, 2014

(65) Prior Publication Data

US 2015/0104139 A1  Apr. 16, 2015

Related U.S. Application Data

(60) Provisional application No. 61/890,669, filed on Oct. 14, 2013.

(51) Int. Cl.
| | | |
|---|---|---|
| *G02B 6/036* | (2006.01) | |
| *G02B 6/032* | (2006.01) | |
| *G02B 6/028* | (2006.01) | |
| *G02B 6/14* | (2006.01) | |
| *H04J 14/04* | (2006.01) | |

(52) U.S. Cl.
CPC .......... *G02B 6/03611* (2013.01); *G02B 6/028* (2013.01); *G02B 6/03666* (2013.01); *G02B 6/14* (2013.01); *H04J 14/04* (2013.01)

(58) Field of Classification Search
None
See application file for complete search history.

(56) References Cited

U.S. PATENT DOCUMENTS

| | | | | |
|---|---|---|---|---|
| 3,973,828 A | * | 8/1976 | Onoda | C03B 37/027 385/125 |
| 6,181,858 B1 | * | 1/2001 | Kato | G02B 6/02014 385/123 |
| 6,275,638 B1 | * | 8/2001 | Sasaoka | G02B 6/02238 385/127 |
| 6,535,678 B1 | | 3/2003 | Yamauchi et al. | |
| 7,174,067 B2 | | 2/2007 | Murshid et al. | |
| 2002/0054743 A1 | * | 5/2002 | Montmorillon | G02B 6/02009 385/124 |
| 2002/0061176 A1 | | 5/2002 | Libori et al. | |
| 2003/0138228 A1 | * | 7/2003 | Gorlier | G02B 6/02214 385/123 |
| 2005/0031262 A1 | * | 2/2005 | Hisatomi | G02B 6/02304 385/33 |
| 2005/0259914 A1 | * | 11/2005 | Padgett | H01Q 21/26 385/16 |
| 2006/0039663 A1 | * | 2/2006 | Golowich | G02B 6/02066 385/127 |
| 2008/0063348 A1 | | 3/2008 | Kumano et al. | |
| 2008/0069506 A1 | * | 3/2008 | DiGiovanni | G02B 6/02009 385/123 |
| 2009/0028332 A1 | * | 1/2009 | Parker | G02F 1/0136 380/256 |

(Continued)

OTHER PUBLICATIONS

Alexeyev, A., et al., "Optical Vortices and the Flow of Their Angular Momentum in a Multimode Fiber," Semiconductor Physics, Quantum Electronics & Optoelectronics, 1998, vol. 1, No. 1, pp. 82-89.

(Continued)

*Primary Examiner* — Mike Stahl
(74) *Attorney, Agent, or Firm* — Slater Matsil, LLP

(57) ABSTRACT

In one embodiment, an optical fiber includes a first layer having a first refractive index and a second layer surrounding the first layer, where the second layer has a second refractive index, an inner radius, and an outer radius. The optical fiber also includes a third layer surrounding the second layer, where the third layer has a third refractive index, where the first refractive index is less than the second refractive index, where the third refractive index is less than the second refractive index, and where a ratio of the outer radius to the inner radius is less than 1.5.

17 Claims, 19 Drawing Sheets

(56) References Cited

U.S. PATENT DOCUMENTS

| | | | |
|---|---|---|---|
| 2009/0169163 | A1 | 7/2009 | Abbott, III et al. |
| 2009/0202191 | A1* | 8/2009 | Ramachandran .. G02B 6/02071 385/11 |
| 2010/0134869 | A1* | 6/2010 | Bernet .................. G02B 5/001 359/290 |
| 2011/0150464 | A1 | 6/2011 | Murshid et al. |
| 2012/0207470 | A1* | 8/2012 | Djordjevic ............. H04B 10/25 398/44 |
| 2012/0263466 | A1 | 10/2012 | Djordjevic et al. |
| 2012/0315006 | A1* | 12/2012 | Bigot-Astruc ..... G02B 6/03666 385/126 |
| 2013/0208332 | A1 | 8/2013 | Yu et al. |
| 2014/0199066 | A1* | 7/2014 | Martelli ............. H04B 10/2581 398/44 |
| 2015/0098697 | A1* | 4/2015 | Marom .................. H04J 14/04 398/44 |
| 2015/0288542 | A1* | 10/2015 | Ashrafi ................. H04L 27/362 375/261 |

OTHER PUBLICATIONS

Awaji, Y., et al., "Demonstration of Spatial Mode Division Multiplexing Using Laguerre-Gaussian Mode Beam in Telecom-Wavelength," 23rd Annual Meeting of the IEEE Photonics Society, Nov. 7-11, 2010, pp. 551-552.

Awaji, Y., et al., "World First Mode/Spatial Division Multiplexing in Multi-Core Fiber Using Laguerre-Gaussian Mode," 7th European Conference and Exposition on Optical Communications, OSA Technical Digest (CD) (Optical Society of America, 2011), paper We.10.P1.55, 3 pages.

Bouchal, Z., et al., "Mixed Vortex States of Light as Information Carriers," New Journal of Physics 6 (2004) 131, pp. 1-15.

Bozinovic, N. et al., "Are Orbital Angular Momentum (OAM/ Vortex) States of Light Long-Lived in Fibers?," Frontiers in Optics 2011/Laser Science XXVII, OSA Technical Digest (Optical Society of America, 2011), paper LWL3.

Bozinovic, N., et al., "Long-Range Fiber-Transmission of Photons with Orbital Angular Momentum," CLEO:2011—Laser Applications to Photonic Applications, OSA Technical Digest (CD) (Optical Society of America, 2011), paper CTuB1, 2 pages.

Bozinovic, N., et al., "Orbital Angular Momentum (OAM) based Mode Division Multiplexing (MDM) over a Km-length Fiber," ECOC Postdeadline Papers © 2012 Optical Society of America, 3 pages.

Bozinovic, N., et al., "Terabit-Scale Orbital Angular Momentum Mode Division Multiplexing in Fibers," Science 340, 1545 (2013), downloaded from www.sciencemag.org Jul. 2, 2013, 5 pages.

Bozinovic, N., et al., Supplementary Material for "Terabit-Scale Orbital Angular Momentum Mode Division Multiplexing in Fibers," Science 340, 1545 (2013), published Jun. 28, 2013, 13 pages.

Brunet, C., "Propagation of OAM Modes Through Optical Fiber," Proposition de Thése de Doctorat, Université Laval, Quebec, Canada, 2013, 64 pages.

Carpenter, J., et al., "Optical Vortex Based Mode Division Multiplexing over Graded-Index Multimode Fibre," OFC/NFOEC Technical Digest © 2013 Optical Society of America, 3 pages.

Dashti, P. Z., et al., "Observation of Orbital Angular Momentum Transfer between Acoustic and Optical Vortices in Optical Fiber," Physical Review Letters, PRL 96, week ending Feb. 3, 2006, 4 pages.

Gibson, G., et al., "Free-Space Information Transfer Using Light Beams Carrying Orbital Angular Momentum," Opt. Express vol. 12, No. 22, Nov. 1, 2004, pp. 5448-5456.

Golowich, S. E., et al., "Fibers Supporting Orbital Angular Momentum States for Information Capacity Scaling," FiO/LS Technical Digest © Optical Society of America 2012, 2 pages.

Gregg, P., et al., "Stable Transmission of 12 OAM States in Air-Core Fiber," CLEO:2013 Technical Digest © OSA 2013, 2 pages.

Hu, M.-L., et al., "A Hollow Beam From a Holey Fiber," Opt. Express vol. 14, No. 9, May 1, 2006, pp. 4128-4134.

Huang, H., et al., "Orbital-Angular-Momentum-Based Reconfigurable and •Lossless• Optical Add/Drop Multiplexing of Multiple 100-Gbit/s Channels," Optical Fiber Communication Conference/National Fiber Optic Engineers Conference 2013, OSA Technical Digest (online) (Optical Society of America, 2013), paper OTh4G.4, 3 pages.

Inao, S., et al., "Multicore Optical Fiber," Optical Fiber Communication, 1979 OSA Technical Digest Series (Optical Society of America, 1979), paper WB1, 3 pages.

Kumar, R., et al., "Generation and Detection of Optical Vortices Using All Fiber-Optic System," Optics Communications 281 (2008), www.elsevier.coom/locate/optcom, Mar. 5, 2008, pp. 3414-3420.

Murshid, S., et al., "Spatial Domain Multiplexing: A New Dimension in Fiber Optic Multiplexing," Optics & Laser Technology 40 (2008), Mar. 7, 2008, www.elsevier.com/locate/optlastec, pp. 1030-1036.

Murshid, S., et al., "Analysis of Spatially Multiplexed Helically Propagating Channels in Step Index Optical Waveguides," Fio/LS Technical Digest © 2011 Optical Society of America, 3 pages.

Murshid, S., et al., "Orbital Angular Momentum in Four Channel Spatial Domain Multi-plexing System for Multi-Terabit per Second Communication Architectures," Proc. SPIE 8397, Enabling Photonics Technologies for Defense, Security, and Aerospace Applications VIII, 839703 (Jun. 8, 2012), 7 pages.

Ramachandran, S., et al., "Generation and Propagation of Radially Polarized Beams in Optical Fibers," Optics Letters, vol. 34, No. 16, Aug. 15, 2009, pp. 2525-2527.

Ren, Y., et al., "Efficient Crosstalk Mitigation of OAM Based 400-Gbit/s QPSK Data Transmission in 1.1-Im Vortex Fiber by Using Soft-Decision LDPC Codes," CLEO: 2013, OSA Technical Digest (online) (Optical Society of America, 2013), paper CM2G.5, 2 pages.

Ryf, R., et al., "12 x 12 MIMO Transmission over 130-km Few-Mode Fiber," Frontiers in Optics 2012/Laser Science XXVIII, OSA Technical Digest (online) (Optical Society of America, 2012), paper FW6C.4, 2 pages.

Ryf, R., et al., "Mode-Division Multiplexing Over 96 km of Few-Mode Fiber Using Coherent 6 x 6 MIMO Processing," Journal of Lightwave Technology, vol., 30, No. 4, Feb. 15, 2012, pp. 521-531.

Service, R. F., "Light Beams with a Twist Could Give a Turbo Boost to Fiber-Optic Cables," Science, vol. 340, www.sciencemag.org, Jun. 28, 2013, p. 1513.

Viswanathan, N. K., et al., "Generation of Optical Vector Beams Using a Two-Mode Fiber," Optics Letters, vol. 34, No. 8, Apr. 15, 2009, pp. 1189-1191.

Volpe, G., et al., "Generation of Cylindrical Vector Beams with Few-Mode Fibers Excited by Laguerre-Gaussian Beams," www. elsevier.com/locate/optcom, Optics Communications 237 (2004), Mar. 29, 2004, pp. 89-95.

Wang, J., et al., "25.6-bit/s/Hz Spectral Efficiency Using 16-QAM Signals over Pol-Muxed Multiple Orbital-Angular-Momentum Modes," 2011 IEEE Photonics Conference (PHO), Oct. 9-13, 2011, pp. 587-588.

Wu, J., et al., "Encoding Information as Orbital Angular Momentum States of Light for Wireless Optical Communications," Communications, Optical Engineering, vol. 46(1), Jan. 2007, pp. 019701-1-019701-5.

Yan, Y., et al., "Fiber Coupler for Generating Orbital Angular Momentum Modes," Optics Letters, vol. 36, No. 21, Nov. 1, 2011, pp. 4269-4271.

Yan, Y., et al., "Efficient Generation and Multiplexing of Optical Orbital Angular Momentum Modes in a Ring Fiber by Using Multiple Coherent Inputs," Optics Letters, vol. 37, No. 17, Sep. 1, 2012, pp. 3645-3647.

Yue, Y., et al., "Mode Properties and Propagation Effects of Optical Orbital Angular Momentum (OAM) Modes in a Ring Fiber," IEEE Photonics Journal, vol. 4, No. 2, Apr. 2012, pp. 545-543.

(56) References Cited

OTHER PUBLICATIONS

Yue, Y., et al., "1.6-Tbit/s Muxing, Transmission and Demuxing through 1.1-km of Vortex Fiber Carrying 2 OAM Beams Each with 10 Wavelength Channels," Optical Fiber Communication Conference/National Fiber Optic Engineers Conference 2013, OSA Technical Digest (online) (Optical Society of America, 2013), paper OTh4G.2, 3 pages.

International Search Report and Written Opinion of Patent Cooperation Treaty (PCT), International Application No. PCT/US14/60502, Applicant Futurewei Technologies, Inc., date of mailing Jan. 8, 2015, 8 pages.

Wang, et al., "Terabit free-space data transmission employing orbit angular momentum multiplexing," Nature Photonics, vol. 6, Jul. 2012, www.nature.com/naturephotonics, Articles published online: Jun. 24, 2012, 9 pages.

\* cited by examiner

CONSTRUCTION OF HOLOGRAM

RECONSTRUCTION OF OBJECT

SYSTEM AND METHOD FOR OPTICAL FIBER

This application claims the benefit of U.S. Provisional Application Ser. No. 61/890,669 filed on Oct. 14, 2013 and entitled "High Contrast Optical Fiber and Methods of Making and Using Thereof," which application is hereby incorporated herein by reference.

TECHNICAL FIELD

The present invention relates to a system and method for optical communications, and, in particular, to a system and method for an optical fiber.

BACKGROUND

The capacity of optical fiber links is increasing. Optical fibers are used in optical fiber communications, datacenters, metropolitan area networks (MAN), access networks, wireless networks, and other networks. Improvements in optical fibers include low-loss single-mode fibers (SMFs), erbium doped fiber amplifiers (EDFAs), wavelength division multiplexing (WDM), and increased spectral efficiency using coherent communications. In optical fiber communications, optical signals are multiplexed in time, wavelength polarization, and phase. Optical signals may also be multiplexed in space by using multiple core fibers and/or higher mode fibers. Multicore fibers have a high complexity in fabrication and may be problematic to couple light into. Few mode fibers (FMF) and multi-mode fibers (MMFs) may also be used to multiplex optical data in space.

SUMMARY

An embodiment optical fiber includes a first layer having a first refractive index and a second layer surrounding the first layer, where the second layer has a second refractive index, an inner radius, and an outer radius. The optical fiber also includes a third layer surrounding the second layer, where the third layer has a third refractive index, where the first refractive index is less than the second refractive index, where the third refractive index is less than the second refractive index, and where a ratio of the outer radius to the inner radius is less than 1.5.

Another embodiment optical fiber includes a first layer having a first refractive index and a second layer surrounding the first layer, where the second layer has a second refractive index. The optical fiber also includes a third layer surrounding the second layer, where the third layer has a third refractive index and a fourth layer surrounding the third layer, where the fourth layer has a fourth refractive index, where the first refractive index is less than the second refractive index, where the third refractive index is less than the second refractive index, and where the third refractive index is less than the fourth refractive index.

An embodiment method of transmitting light includes generating a plurality of orbital angular momentum (OAM) modes and coupling the plurality of OAM modes into an optical fiber. The optical fiber includes a first layer having a first refractive index and a second layer surrounding the first layer, where the second layer has a second refractive index, an inner radius, and an outer radius, and a third layer surrounding the second layer, where the third layer has a third refractive index, where the first refractive index is less than the second refractive index, where the third refractive index is less than the second refractive index, and where a ratio of the outer radius to the inner radius is less than 1.5. The method also includes propagating the plurality of OAM modes along the optical fiber to produce a plurality of propagated OAM modes.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
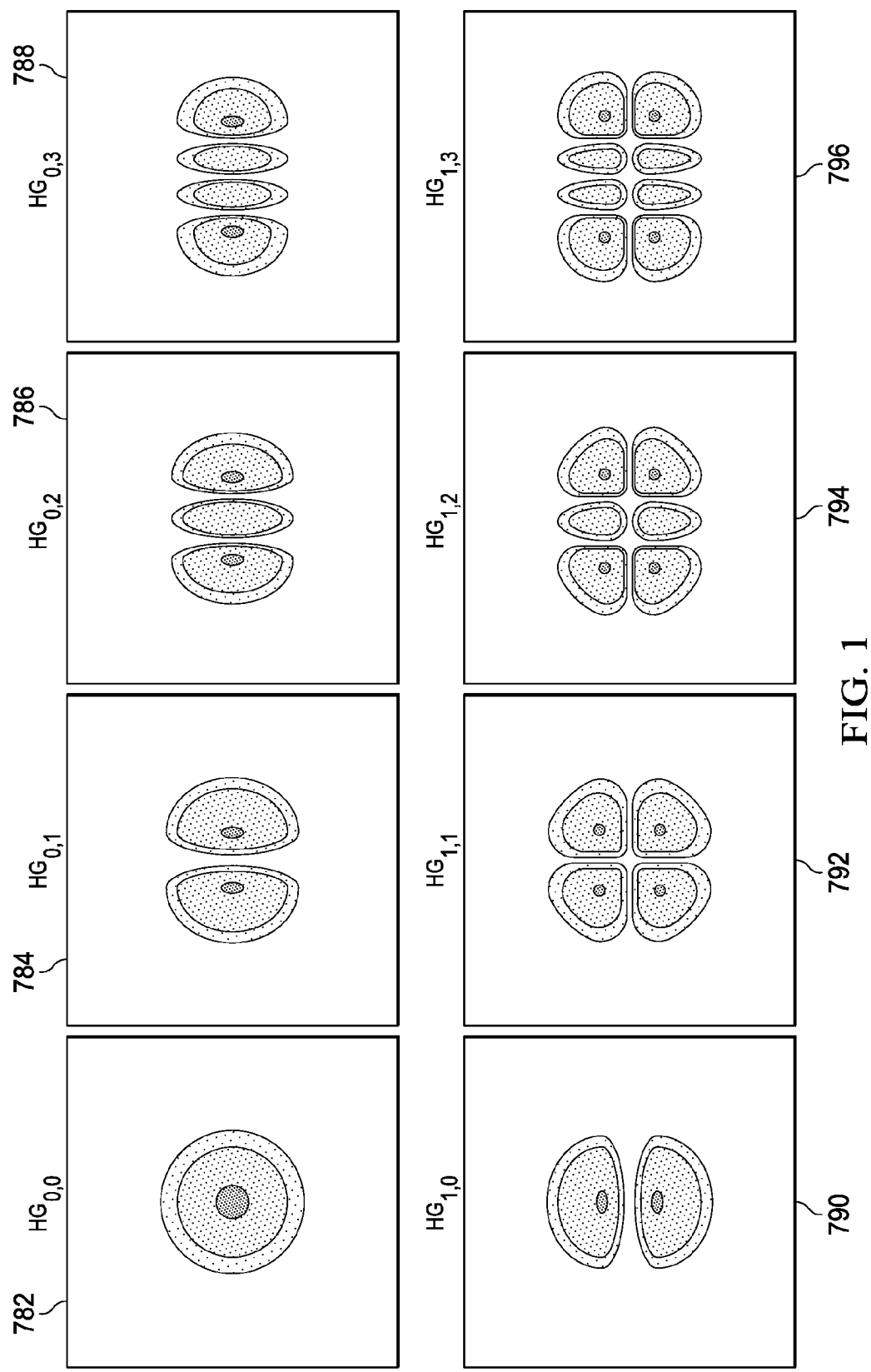
FIG. 1 illustrates Hermite-Gaussian mode distributions.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An embodiment optical fiber transmits multiple orbital angular momentum (OAM) modes with a separation between the modes. An embodiment optical fiber has a large hollow core, surrounded by a ring-core, which is a thin layer of high refractive index material. Around the high refractive index material is another slightly wider layer of material with a low refractive index, surrounded by silica cladding. The high contrast between the hollow core and high refractive index achieve a significant difference between the effective indices of OAM modes in the optical fiber.

Multimode fibers may transmit multiple linearly polarized (LP) modes. However, a system with LP modes uses heavy multiple-input multiple-output (MIMO) processing, because LP modes contain hybrid eigenmodes with slightly different propagation constants, which may cause mode walk-off during propagation.

Spin angular momentum (SAM) of light causes light to be polarized. The SAM is associated with the spin of photons, and has a value of $\sigma\hbar$. Also, light may spin and carry OAM. OAM is a natural property of helically phased beams. Helically phased beams are described by electric and magnetic fields with an azimuthal phase in the form:

$$u(r,\phi,z) = u_0(r,z)e^{jl\phi},$$

where u is the envelope of the field and l is an integer. Because the phase is not defined at r=0, there is no intensity at the center of the beam. Thus, OAM beams are known as optical vortex or cylindrical vector beams (CVBs). Under the paraxial approximation, total angular momentum is the sum of spin and orbital angular momentum (j=σ+l), implying that spin and orbital angular momentum are independent.

OAM light has a variety of applications, including the ability to spin microscopic objects, trapping and guiding atoms, in imaging, and in quantum optics. OAM states may carry information, because OAM states are orthogonal to each other. OAM states may be transmitted over back-to-back systems, without a propagation distance, to demonstrate multiplexing and demultiplexing. Other examples are over C-Band and combining OAM states with wavelength division multiplexing (WDM), polarization division multiplexing (PDM), and coherent detection. Also, OAM states may be used to perform quantum cryptography.

Optical fibers may generate OAM modes using mechanically stressed fibers, acousto-optic interaction, fiber couplers, few-mode fibers (FMFs), and highly non-linear photonic crystal fibers, using fibers a few centimeters long, not used as propagation media. In one example, OAM modes are propagated into multimode fiber.

Optical modes exist in guiding media, such as optical fibers, as well as in free-space laser beams. Transverse electric (TE) fields have no magnetic field in the direction of propagation and a nonzero electric field in the direction of propagation, while transverse magnetic (TM) fields have a nonzero magnetic field in the direction of propagation and no electric field in the direction of propagation. Transverse electro-magnetic (TEM) fields have no electric or magnetic fields in the direction of propagation, while hybrid fields have nonzero electrical and magnetic fields in the direction of propagation.

Many laser beams may be approximated by a Gaussian function in a Gaussian mode. A Gaussian beam is described by:

$$\vec{E}(r,z) = E_0 \frac{w_0}{w(z)} \exp\left(-\frac{r^2}{w(z)^2}\right) \exp\left(-j\left[kz - \arctan\frac{z}{z_R} + \frac{kr^2}{2R(z)}\right]\right),$$

where $|E_0|$ is the peak amplitude, $\omega_0$ is the beam radius at the beam waist, $k=2\pi/\lambda$ is the wavenumber, the beam radius is given by:

$$\omega(z) = \omega_0 \sqrt{1 + \left(\frac{z}{z_R}\right)^2},$$

$z_R = 2\pi\omega/\lambda$ is the Rayleigh length, and R(z) is the radius of the wavefront.

Many laser cavities are rectangular, and thus produce rectangular shaped Hermite-Gaussian modes, which are identified as $HG_{n,m}$, where n+1 and m+1 are the number of rows and columns of intensity spots. $HG_{0,0}$ is the fundamental Gaussian mode. Hermite-Gaussian modes are described by the product of a Gaussian function and a Hermite polynomial. The intensity of the electric field is given by:

$$\vec{E}_{n,m}(x,y,z) = E_0 \frac{w_0}{w(z)} H_n\left(\sqrt{2}\frac{x}{w(z)}\right) \exp\left(-\frac{x^2}{w(z)^2}\right) H_m\left(\sqrt{2}\frac{y}{w(z)}\right)$$

$$\exp\left(-\frac{x^2}{w(z)^2}\right) \exp\left(-j\left[kz - (1+n+m)\arctan\frac{z}{z_R} + \frac{k(x^2+y^2)}{2R(z)}\right]\right),$$

where $H_n(x)$ is the Hermite polynomial, with non-negative integer index n, defined by:

$$H_n(z) = (-1)^n e^{x^2} \frac{d^n}{dx^n} e^{-x^2}.$$

FIG. 1 illustrates Hermite-Gaussian mode, where mode 782 is $HG_{0,0}$, mode 784 is $HG_{0,1}$, mode 786 is $HG_{0,2}$, mode 788 is $HG_{0,3}$, mode 790 is $HG_{1,0}$, mode 792 is $HG_{1,1}$, mode 794 is $HG_{1,2}$, and mode 796 is $HG_{1,3}$.

Laguerre-Gaussian modes describe cylindrical laser modes. Laguerre-Gaussian modes are denoted by $LG_{n,m}$, where $l=|n-m|$ is the azimuthal index and $p=\min(n, m)$ is the radial index. The field diameter depends on l, while the number of intensity rings is given by p+1. The fundamental mode is $LG_{0,0}$. The electric field is described by:

$$\vec{E}_{n,m}(r, \phi, z) = E_0 \frac{w_0}{w(z)} L_{\min(n,m)}^{|n-m|}\left(\frac{2r^2}{w(r)^2}\right)(-1)^{\min(n,m)}\left(\sqrt{2}\frac{r}{w(z)}\right)^{|n-m|}$$

$$\exp\left(-\frac{r^2}{w(z)^2}\right)\exp\left(-j\left[(n-m)\phi + (1+n+m)\arctan\frac{z}{z_R} + \frac{kr^2}{2R(z)}\right]\right),$$

where $L_p^l$ is the generalized Laguerre polynomial, defined as:

$$L_p^l(x) = \frac{x^{-l}e^x}{p!}\frac{d^p}{dx^p}(e^{-x}x^{p+l}).$$

$LG_{n,m}$ modes may be built from linear combinations of $HG_{n,m}$ modes, for example:

$$LG_{0,2} = \frac{1}{2}HG_{2,0} + \frac{j}{\sqrt{2}}HG_{1,1} - \frac{1}{2}HG_{0,2},$$

$$LG_{1,1} = \frac{1}{\sqrt{2}}HG_{2,0} + \frac{1}{\sqrt{2}}HG_{0,2},$$

and $$LG_{2,0} = \frac{1}{2}HG_{2,0} - \frac{j}{\sqrt{2}}HG_{1,1} - \frac{1}{2}HG_{0,2}.$$

Figure 2:
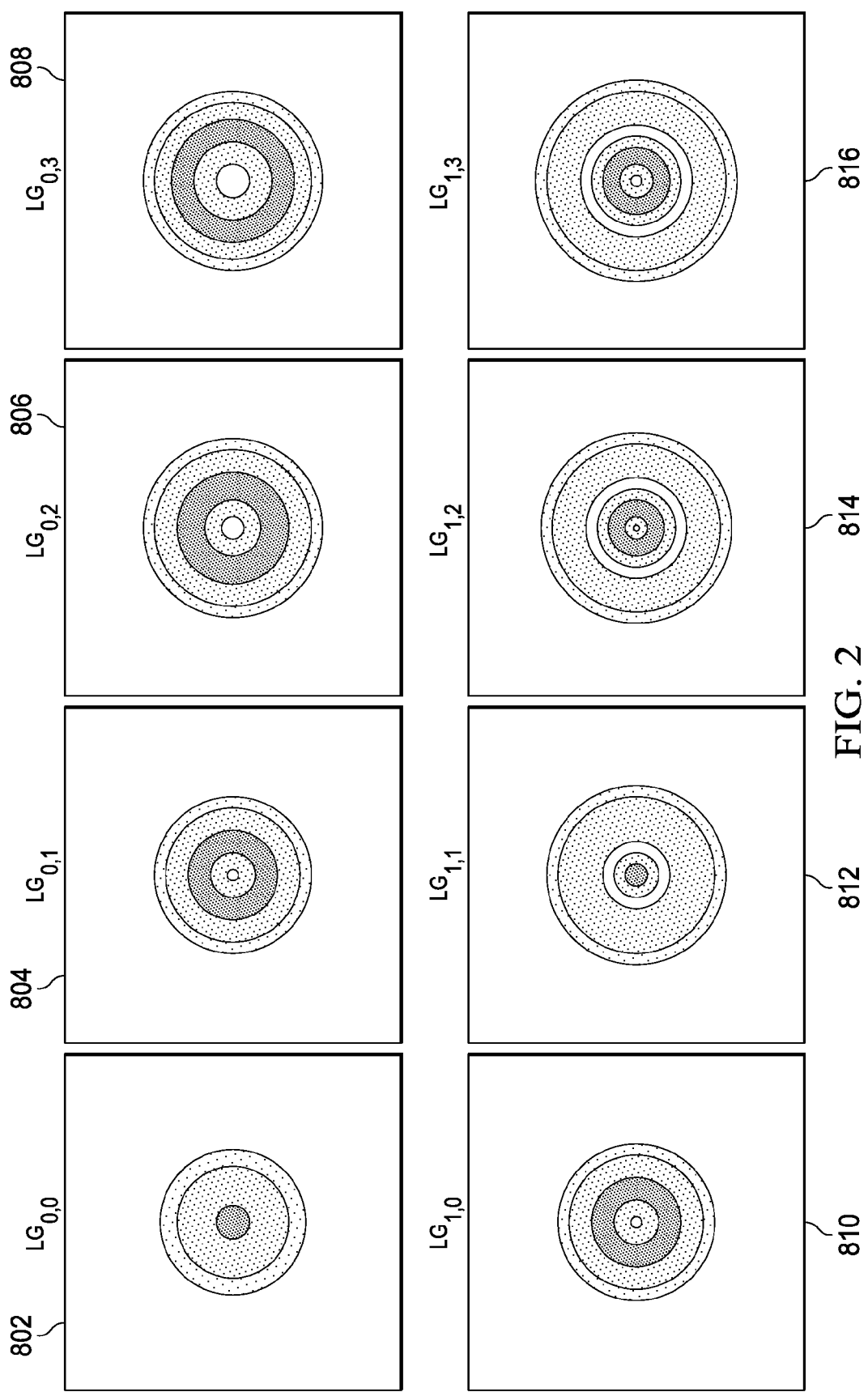
FIG. 2 illustrates Laguerre-Gaussian mode distributions.

FIG. 2 illustrates some LG modes, including mode 802, which is $LG_{0,0}$, mode 804, which is $LG_{0,1}$, mode 806, which is $LG_{0,2}$, mode 808, which is $LG_{0,3}$, mode 810, which is $LG_{1,0}$, mode 812, which is $LG_{1,1}$, mode 814, which is $LG_{1,2}$, and mode 816, which is $LG_{1,3}$.

Vector modes are the eigenmodes of cylindrical optical fibers. The electrical and magnetic fields of vector modes have nonzero components in all directions on the Cartesian plane. Vector modes are represented by EH when the electrical field dominates in the direction of propagation and HE when the magnetic field dominates in the direction of propagation. Vector modes are identified by the parameters v and m, where v is a non-negative integer corresponding to the number of azimuthal symmetry axis in the field components and m is a positive integer corresponding to the number of concentric rings in the intensity of the field. Also, vector modes may be even or odd, corresponding to the azimuthal symmetry of the fields. Modes are identified by $\xi_{v,m}^\psi$ where $\xi$ is HE, EH, TE, or TM, and $\psi$ is either even or odd. When v=0, vector modes are not hybrid, but are either TE or TM modes. Solving the characteristic equation of a waveguide finds the supported molds. The value of v and the possible effective indices may be determined. Modes are ordered based on their effective indices, starting with the highest effective index, to yield:

$HE_{v,1} > EH_{v,1} > HE_{v,2} > EH_{v,2} > HE_{v,3} > \ldots$ $TE_{0,1} > TE_{0,2} > TE_{0,3} > \ldots$ $TM_{0,1} > TM_{0,2} > TM_{0,3} > \ldots$ In many cases, a weakly guided estimation may be used, when the indices of the core ($n_1$) and the cladding ($n_2$) are nearly identical. Fields of LP modes only have one component, either in the x or y axis. LP modes may be referred to as scalar modes. LP modes are TEM modes, because they have zero electrical and magnetic field in the direction of propagation. LP modes may have the form $LP_{l,m\,pol}^\psi$, where $\psi$ is even or odd, l is a non-negative integer corresponding to the number of azimuthal symmetry axes in the fields, m is a positive integer corresponding to the number of concentric rings in the intensity fields, and pol is x or y, indicating the axis of polarization of the electrical field. When l=0, the intensity of the fields is circular, and there is no even and odd degeneracies. For other LP modes there are four variants, even or odd, and x or y. LP modes are combinations of vector modes with similar effective indices given by:

$$LP_{\ell,m} = \begin{cases} HE_{1,m}^{even} + HE_{1,m}^{odd} & \ell = 0 \\ HE_{2,m}^{even} + HE_{2,m}^{odd} + TM_{0,m} + TE_{0,m} & \ell = 1 \\ HE_{\ell+1,m}^{even} + HE_{\ell+1,m}^{odd} + EH_{\ell-1,m}^{even} + EH_{\ell-1,m}^{odd} & \ell > 1 \end{cases}$$

Figure 3:
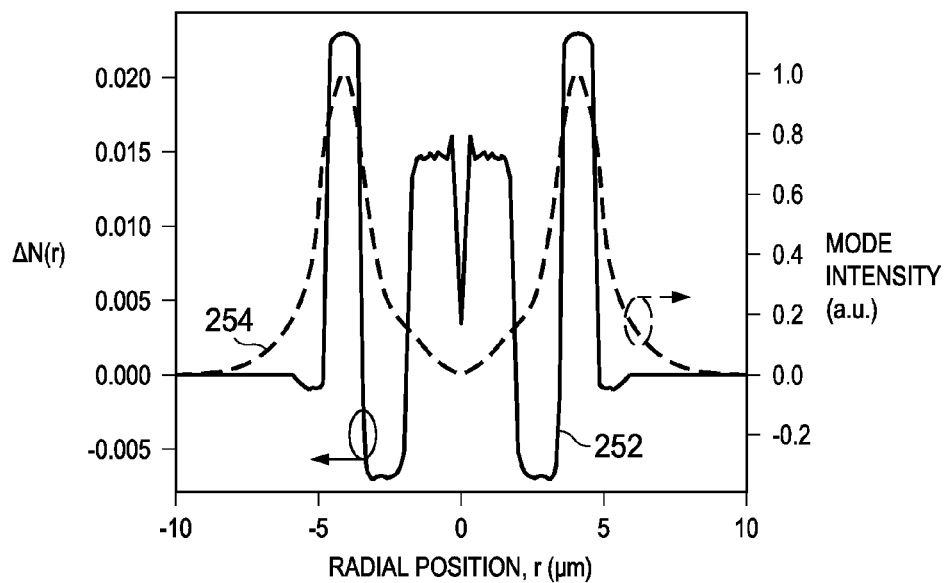
FIG. 3 illustrates a graph change in refractive index and mode intensity verses position for a vortex fiber.
Figure 4:
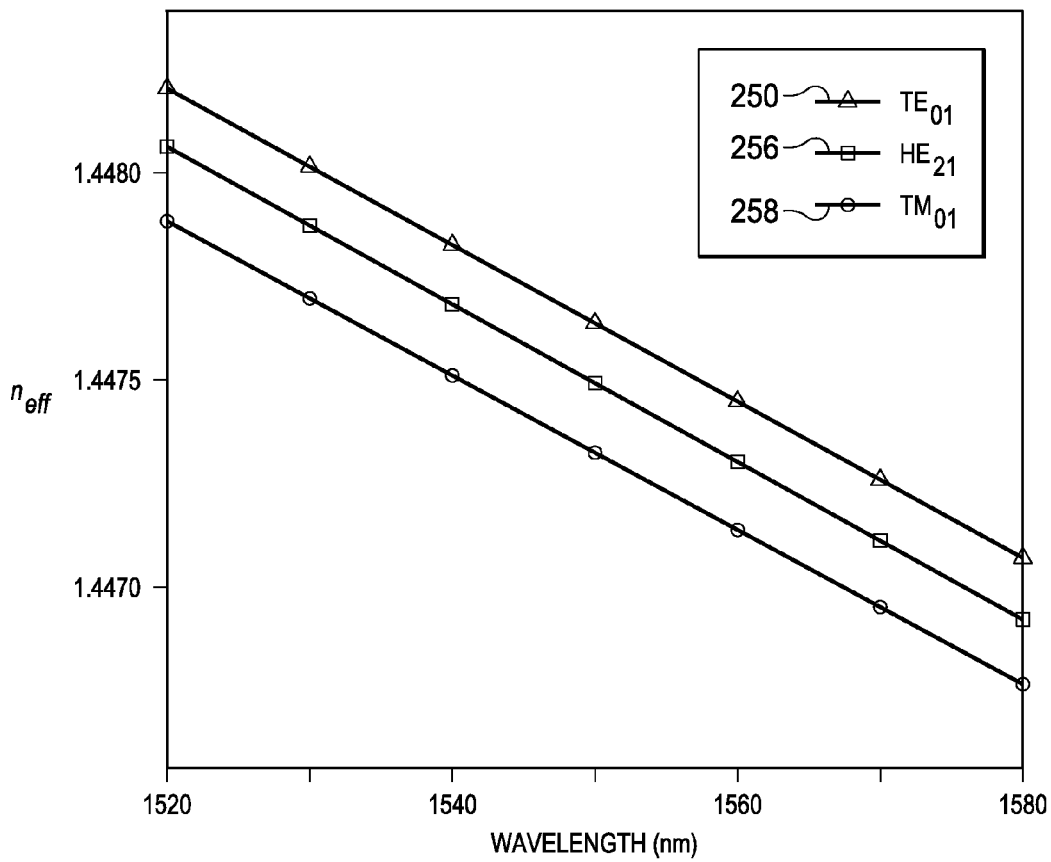
FIG. 4 illustrates a graph of effective index versus wavelength for modes in a vortex fiber.

A vortex fiber may propagate OAM modes. Mode $OAM_{p,l}^{\mp}$ is defined where + or − indicates whether the mode is right circularly polarized or left circularly polarized, respectively, the number of concentric rings of intensity in the field is p+1, the absolute value of l is the number of times the phase of the field goes from 0 to $2\pi$ over the azimuthal circle, and the sign of l identifies whether the rotation of the phase of the field is clockwise (right handed) or counter-clockwise (left handed). In multimode fibers, the $HE_{2,1}$, $TM_{0,1}$, and $TE_0$ modes have similar propagation constants, causing them to couple to the $LP_{1,1}$ mode. The vortex fiber separates the effective indices of those modes, pulling them more than $10^{-4}$ apart, facilitating the $HE_{2,1}$ mode, an eigenmode of $OAM_{0,1}$ mode, to propagate without degeneracy. The vortex fiber may propagate 2 OAM and 2 $LP_{0,1}$ modes using low density parity check (LDPC) codes and quadrature phase-shift keying (QPSK) modulation. Also, a vortex fiber may transmit WDM with 16 quadrature amplitude modulation (QAM). FIG. 3 illustrates a graph of refractive index profile (curve 252) verses position, and of mode intensity (curve 254). FIG. 4 illustrates a graph of effective index of $LP_{1,1}$, eigenmodes, versus position. Curve 250 shows the effective index for $TE_{0,1}$, curve 256 shows the effective index for $HE_{2,1}$, and curve 258 shows the effective index for $TM_{0,1}$. This fiber supports four modes, $OAM_{0,0}^{\mp}$, which corresponds to circularly polarized $LP_{0,1}$, and $OAM_{0,1}^{\mp}$ modes. Mode separation is about $1.8 \cdot 10^{-4}$. The center core supports a Gaussian $LP_{0,1}$ mode, while the outer ring supports the $OAM_{0,1}$ mode. This vortex fiber does not support higher order OAM modes.

Figure 5:
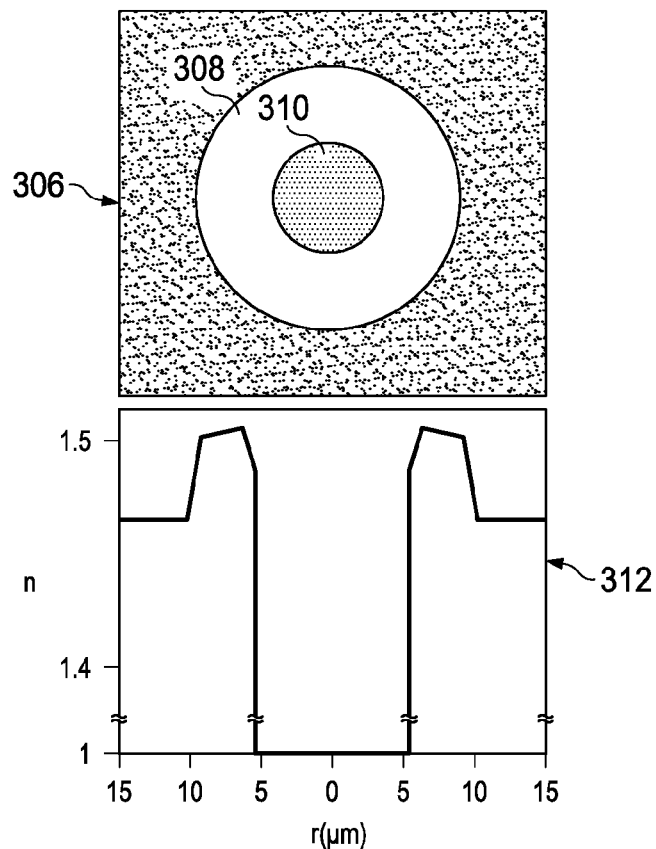
FIG. 5 illustrates an image of an air core fiber and a graph of refractive index verses position for an air core fiber.
Figure 6:
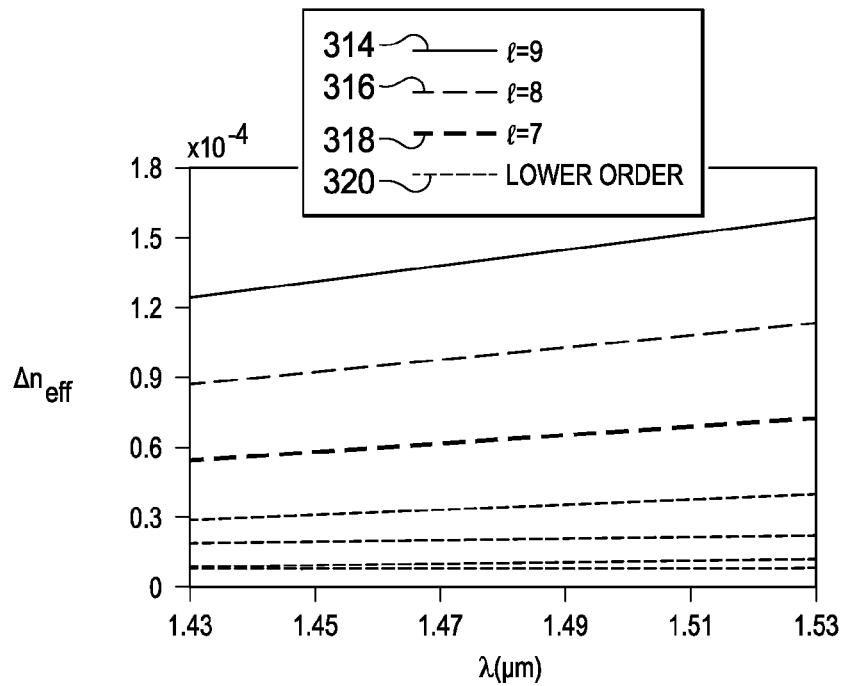
FIG. 6 illustrates a graph of effective refractive index verses wavelength for an air core fiber.

An example air core fiber transmits 12 OAM modes over 2 m and 2 OAM modes over 2 km. The air core fiber supports a large number of modes, with a large average mode separation, and a few modes which have a larger separation. FIG. 5 illustrates air core fiber 306 with air core 310 and cladding 308, and graph 312 with the index of refraction verses radius for an air core fiber. FIG. 6 illustrates a graph of refractive index mode separation verses versus wavelength. Curve 314 shows the refractive index separation for l=9, curve 316 shows the refractive index separation for l=8, curve 318 show the refractive index separation for l=7, and curves 320 show the refractive index separation for lower order modes. Modes $OAM_{0,\mp 9}^{\mp}$ and $OAM_{0,\mp 8}^{\mp}$ have a mode separation greater than $1\cdot 10^{-4}$.

OAM modes may use less MIMO processing than LP modes for spatial multiplexing, because eigenmodes of OAM modes are two degeneracies of the same mode with the same propagation constant, while eigenmodes of LP modes are different vector modes with different propagation constants. Also, the intensity fields of OAM modes are closer to Gaussian fields than LP modes, suggesting better coupling efficiency between the laser and fiber modes. Additionally, OAM modes are polarization maintaining.

There are several methods of generating OAM modes. OAM beams have a phase singularity in their light field. The phase of the OAM beam varies from 0 to 2πl, where l is an integer, either clockwise or counterclockwise around the singularity. OAM beams may be generated by transforming the phase of a laser beam or a Gaussian beam. The phase transformation may be done through computer generated hologram (CGH) or spiral phase pattern (SPP).

Figure 7:
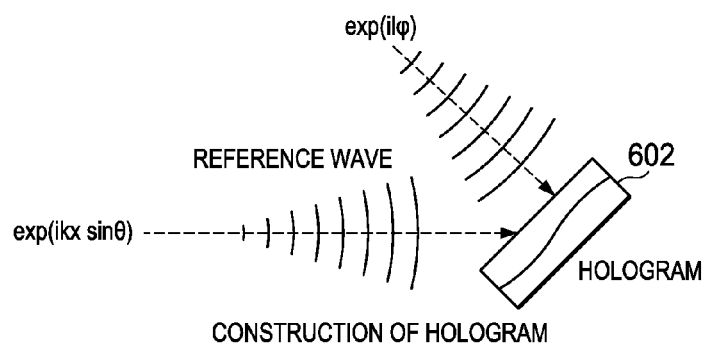
FIG. 7 illustrates generation of a computer generated hologram (CGH)

Passive elements, such as CHG and SPP, are relatively inexpensive, but lack versatility, are precisely manufactured, are wavelength dependent, and have losses from the use of free-space optics. CGH may be printed on a transparency using a printer, etched on a glass plate using photolithography, or transferred to a spatial light modulator (SLM) through a computer to produce different order OAM beams. OAM beams may be generated using a hologram constructed on film or glass. FIG. 7 illustrates the generation of OAM beams using a CGH. A hologram is printed on reflective medium 602. The construction of the hologram is done by illuminating the film with a reference wave:

$$e^{jk\times sin(\theta)},$$

and with $$e^{jl\phi}.$$

Figure 8:
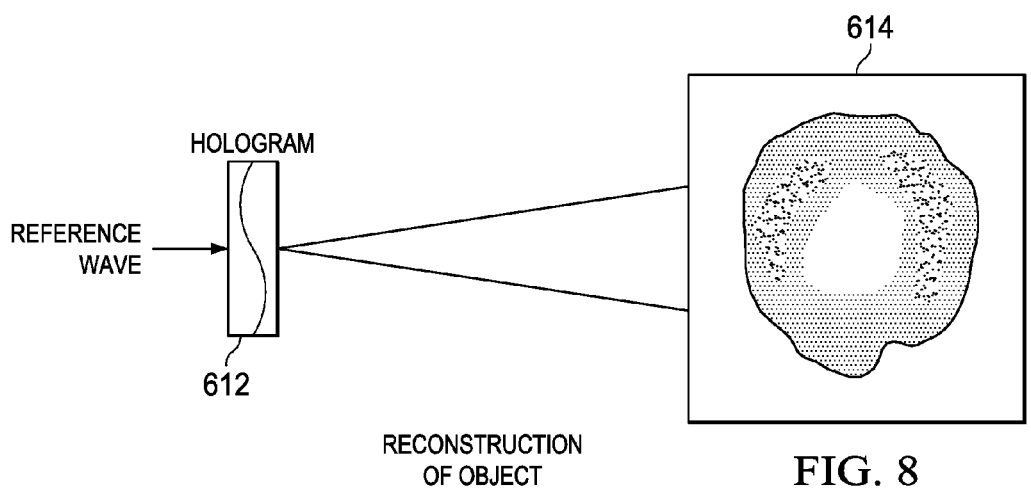
FIG. 8 illustrates generation of an orbital angular momentum (OAM) mode from a Gaussian mode using a CGH.
Figure 9:
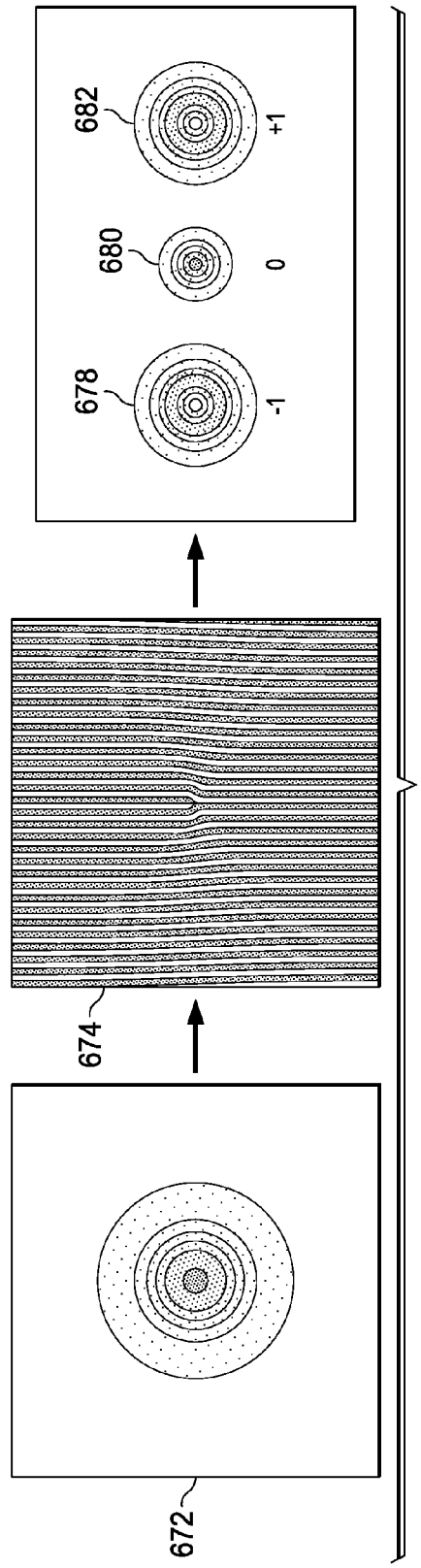
FIG. 9 illustrates OAM modes generated from Gaussian modes by a CGH.

In another example, the hologram is made by programming a spatial light modulator. FIG. 8 illustrates a reference wave on hologram 612 producing mode 614, a donut shaped intensity signal on an OAM beam examined on a charge coupled device (CCD) camera. FIG. 9 illustrates the conversion of a Gaussian beam to an OAM beam using CGH. Gaussian beam spot 672 is converted to OAM beam spots 678 and 682 using CGH 674. The OAM beams are formed at the diffraction order and spatially dispersed off center to OAM beams 678 and 682, while non-diffracted light remains at beam 680. Due to the nature of the conversion process, the available power is reduced, because several diffraction orders are produced from the same light source.

Figure 10:
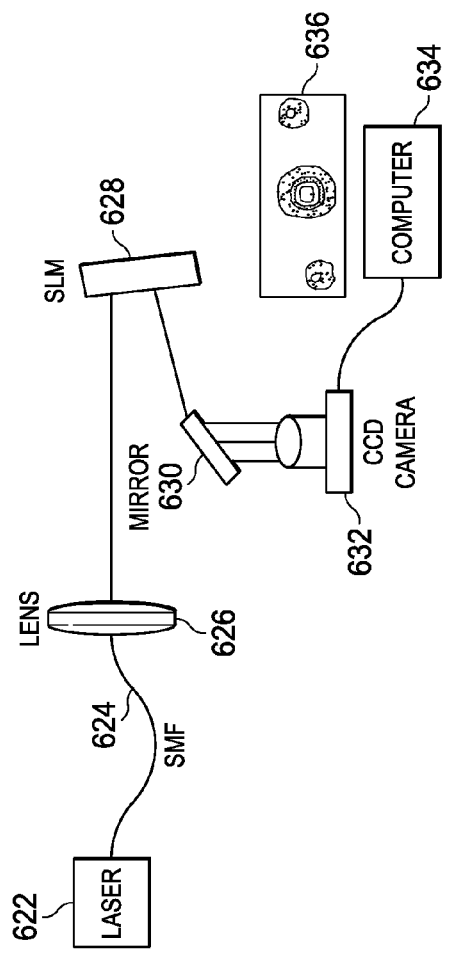
FIG. 10 illustrates generation of OAM modes from Gaussian modes using a CGH.
Figure 11:
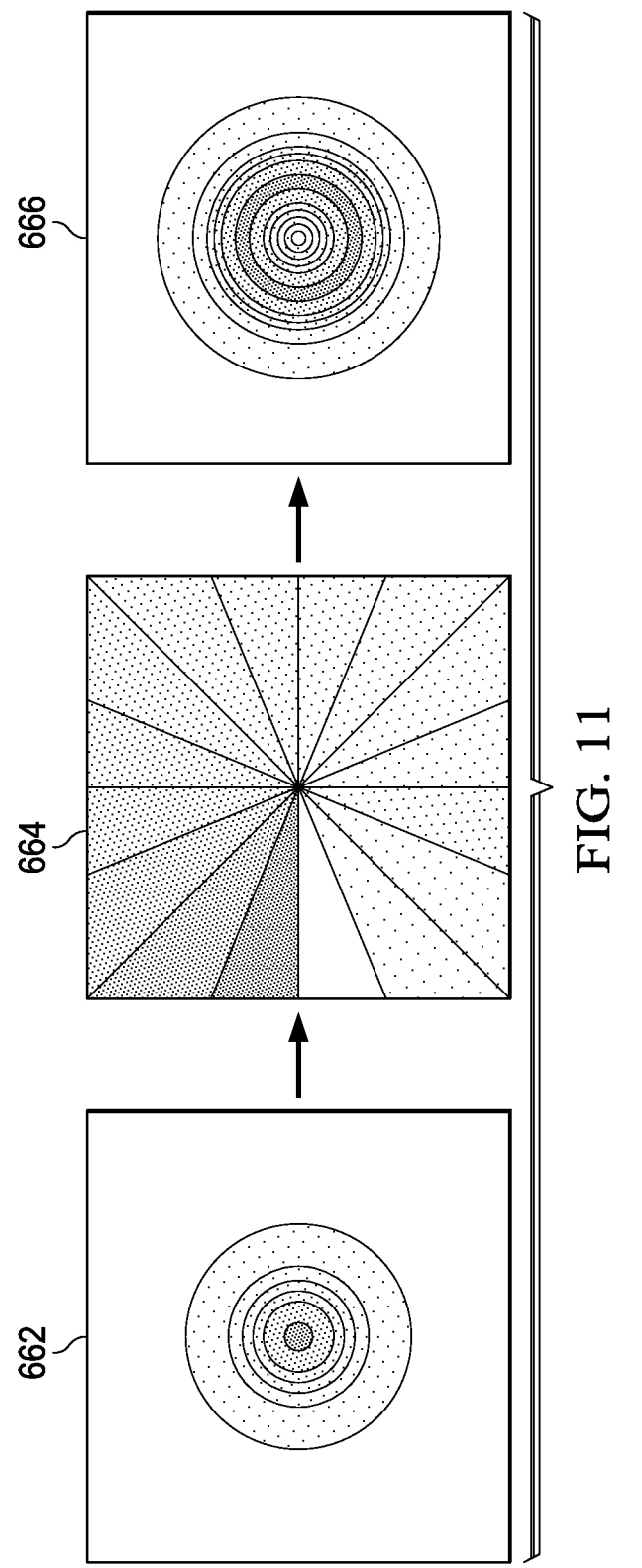
FIG. 11 illustrates an OAM mode generated from a Gaussian mode by an SPP.

In another example, OAM beams are generated by transferring an SPP via an SLM. The entire Gaussian beam may be converted into an OAM beam. FIG. 10 illustrates the generation of an OAM beam using a CGH. Laser 622 generates a light beam which propagates along single mode fiber (SMF) 624. The beam passes through lens 626 to become a free space beam, which reflects off SLM 628 and mirror 630. The beam is received by CCD camera 632 and analyzed on computer 634, where image 636 is observed. Using different areas of the same SLM, many OAM beams may be simultaneously generated. Also, the SLM is reconfigurable, but are expensive, and the coupling between optical fibers and free space optics may be a source of loss. FIG. 11 illustrates the generation of OAM beams using an SPP. Gaussian beam spot 662 is converted to OAM beam spot 666 using SPP 664.

Photonic integrated circuits (PICs) may be used. PICs facilitate coupling the OAM beams directly into the optical fiber without free space. In another example, a multicore fiber is used to generate and recover OAM modes. Alternatively, each channel is a separate ring of light into the fiber.

Figure 12:
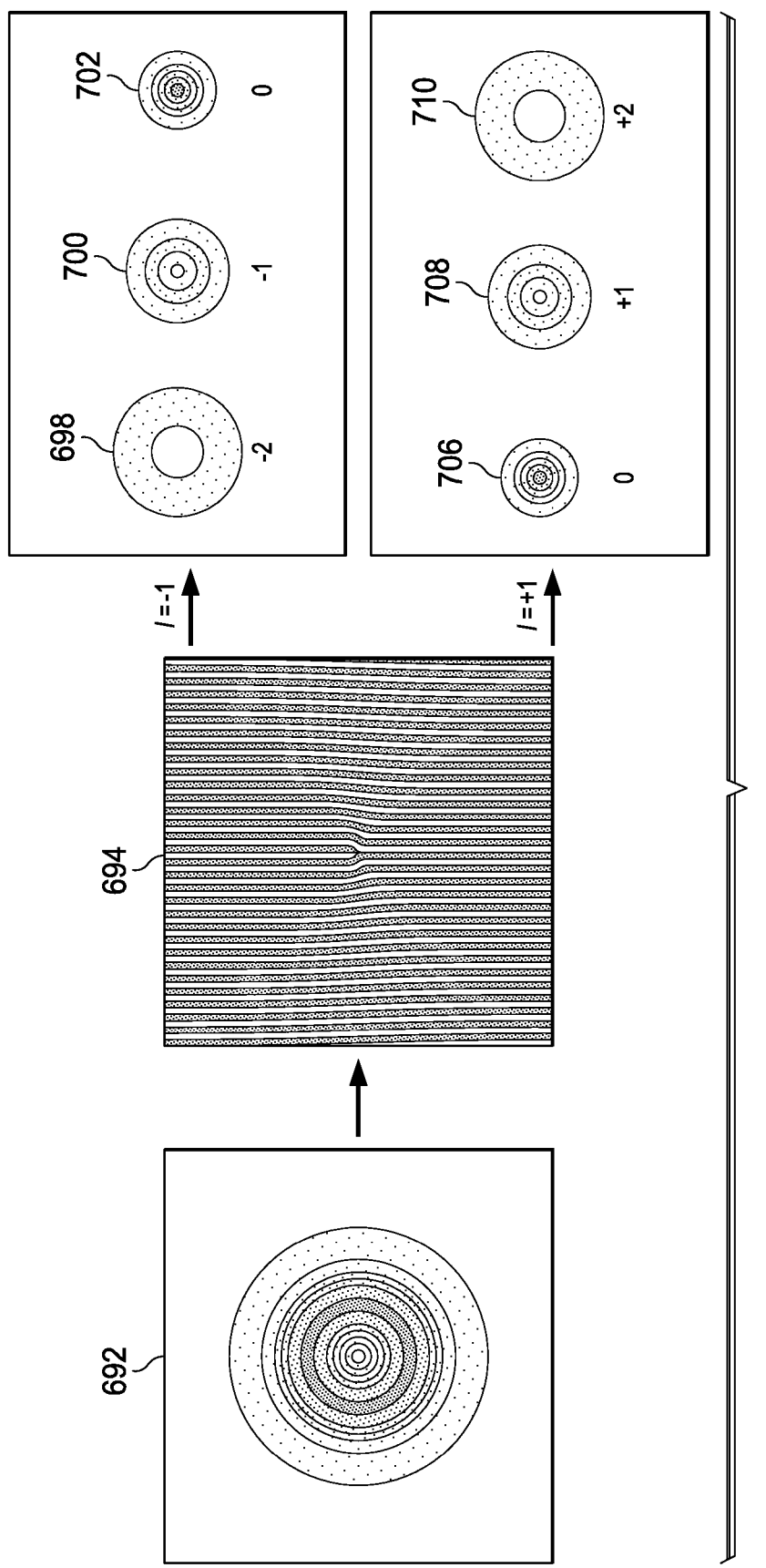
FIG. 12 illustrates OAM mode converting OAM modes to Gaussian modes using a CGH.

OAM beams may be converted to Gaussian beams, for example for a receiver designed to detect a Gaussian intensity shaped beam. When only one OAM mode is present, an SPP technique may be used. When multiple OAM modes are used, demultiplexing may simultaneously be performed. For example, a CGH technique creates spatial separation of the converted modes, and it may be used to convert and demultiplex simultaneously. FIG. 12 illustrates the conversion of an OAM to three modes. When l=−1, OAM mode 692 is converted to Gaussian modes 698, 700, and 702 by CGH 694. When l=1, OAM mode 692 is converted to Gaussian modes 706, 708, and 710 by CGH 694.

Modeling may precisely describe OAM modes in optical fibers. Fiber modes may be derived from Maxwell's equations, and may be solved for fibers with many steps or layers. For a non-magnetic dielectric optical fiber with time dependency and no variation on the z propagation axis:

$$\nabla^2 \vec{E} + \nabla\left(\vec{E}\cdot\frac{\nabla\varepsilon}{\varepsilon}\right) + \omega^2\mu_0\varepsilon\vec{E} = 0$$

$$\nabla^2 \vec{H} + \left(\frac{\nabla\varepsilon}{\varepsilon}\right)\times\nabla\times\vec{H} + \omega^2\mu_0\varepsilon\vec{H} = 0.$$

For radial position r and azimuthal position ϕ at time t:

$$\vec{E}=\vec{E}(r,\phi,z,t)=\vec{E}(r,\phi)\exp\{j(\omega t-\beta z)\},$$

and $$\vec{H}=\vec{H}(r,\phi,z,t)=\vec{H}(r,\phi)\exp\{j(\omega t-\beta z)\},$$

are the electric and magnetic fields, respectively, $\nabla^2$ is the Laplacian, $\nabla$ is the gradient, $\nabla\times$ is the curl operator, $\in$ is the dielectric permittivity of the material, $\mu_0=1.257\cdot 10^{-6}$ H/m, the vacuum permeability, and ω is the angular frequency of the light. Also, the propagation constant of a given mode is defines as:

$$\beta=kn_{\mathit{eff}},$$

where $n_{\mathit{eff}}$ is the effective index of the mode, and:

$$k=\frac{2\pi}{\lambda}=\frac{\omega}{c}.$$

Assuming the fiber is a step index material, the equations may be simplified by removing the gradient, because $\nabla\in=0$. This yields expressions of the electric field and magnetic field in the form of Bessel functions Jv, Yv, Kv, and Iv. The order of the Bessel function, v, is a non-negative integer. The fields may be separated into three components: $e_z$ and $h_z$ in the direction of propagation, $e_r$ and $h_r$ radially in the fiber, and $e_\phi$ and $h_\phi$ perpendicular to the fiber. These components are linked such that:

$$e_r(r, \phi) = \pm j \frac{k\rho^2}{U^2} \left[ n_{\mathit{eff}} \frac{\partial e_z}{\partial r} + \sqrt{\frac{\mu_0}{\varepsilon_0}} \frac{1}{r} \frac{\partial h_z}{\partial \phi} \right],$$

$$e_\phi(r, \phi) = \pm j \frac{k\rho^2}{U^2} \left[ \frac{n_{\mathit{eff}}}{r} \frac{\partial e_z}{\partial \phi} - \sqrt{\frac{\mu_0}{\varepsilon_0}} \frac{\partial h_z}{\partial r} \right],$$

$$h_r(r, \phi) = \pm j \frac{k\rho^2}{U^2} \left[ n_{\mathit{eff}} \frac{\partial h_z}{\partial r} - \sqrt{\frac{\varepsilon_0}{\mu_0}} \frac{n^2}{r} \frac{\partial e_z}{\partial \phi} \right],$$

and $$h_\phi(r, \phi) = \pm j \frac{k\rho^2}{U^2} \left[ \frac{n_{\mathit{eff}}}{r} \frac{\partial h_z}{\partial \phi} + \sqrt{\frac{\varepsilon_0}{\mu_0}} n^2 \frac{\partial e_z}{\partial r} \right],$$

where $\varepsilon_0 = 8.854 \cdot 10^{-12}$ F/m is the vacuum permittivity and $$U = k\rho \sqrt{|n_{\mathit{eff}}^2 - n^2|}.$$

Also, $\rho$ is the outer radius of the fiber layer at point $(r, \phi)$ (or the inner radius for the cladding), and n is the refractive index at point $(r, \phi)$. The sign of $e_r$, $h_r$, $e_\phi$, and $h_\phi$ depend on whether $n_{\mathit{eff}}$ is smaller than n or greater than n.

Differential equations for $e_z$ and $h_z$ vary based on whether the refractive index n of the current layer is smaller or greater than the effective index $n_{\mathit{eff}}$. There are two sets of solutions with different Bessel functions, given by:

$$e_z(r, \phi) = \begin{cases} \left[ A \frac{J_v(Ur/\rho)}{J_v(U)} + B \frac{Y_v(Ur/\rho)}{Y_v(U)} \right] f_v(\phi) & \text{if } n_{\mathit{eff}} < n \\ \left[ A \frac{K_v(Ur/\rho)}{K_v(U)} + B \frac{I_v(Ur/\rho)}{I_v(U)} \right] f_v(\phi) & \text{if } n_{\mathit{eff}} > n \end{cases},$$

and $$h_z(r, \phi) = \begin{cases} \left[ A' \frac{J_v(Ur/\rho)}{J_v(U)} + B' \frac{Y_v(Ur/\rho)}{Y_v(U)} \right] g_v(\phi) & \text{if } n_{\mathit{eff}} < n \\ \left[ A' \frac{K_v(Ur/\rho)}{K_v(U)} + B' \frac{I_v(Ur/\rho)}{I_v(U)} \right] g_v(\phi) & \text{if } n_{\mathit{eff}} > n \end{cases},$$

where A, B, A', and B' are constants.

$$f_v(\phi) = \begin{cases} \cos(v\phi) & \text{even mode} \\ \sin(v\phi) & \text{odd mode} \end{cases},$$

and $$g_v(\phi) = \begin{cases} -\sin(v\phi) & \text{even mode} \\ \cos(v\phi) & \text{odd mode} \end{cases}.$$

Even and odd modes are naming conventions based on the orientation of the electrical field. The general solution may be expressed as:

$$f_v(\phi) = \cos(v\phi + \psi),$$

$$g_v(\phi) = -\sin(v\phi + \psi),$$

where $\psi$ is the phase. In the convention, $\psi = 0$ for even modes and $\psi = \pi/2$ for odd nodes.

In the center of the fiber, when r approaches 0, solutions are only functions of $J_v$ or $I_v$ as $Y_v$ and $K_v$ diverge. When the effective index is higher than the index in the cladding, the solution in the cladding is a function of $K_v$ because $I_v$ diverges when r goes to infinity. When the effective index is lower than the cladding, the solution oscillates, and there is a leaky mode, because the $J_v$ and $Y_v$ Bessel functions oscillate.

A step-index optical fiber with only a core and a cladding has the characteristic equation:

$$\left[ \frac{J_v'}{uJ_v} + \frac{K_v'}{wK_v} \right] \left[ \frac{J_v'}{uJ_v} + \frac{n_2^2}{n_1^2} \frac{K_v'}{wK_v} \right] = \left[ \frac{v\beta}{kn_1} \right]^2 \left[ \frac{1}{u^2} + \frac{1}{w^2} \right]^2,$$

where $$u^2 + w^2 = V^2 = \left[ k\rho \sqrt{n_1^2 - n_2^2} \right]^2.$$

Also, $n_1$ and $n_2$ are the respective indices of the core and cladding, and $J_v'$ and $K_v'$ are the first derivatives of $J_v$ and $K_v$ with respect to $\mu$ and $\omega$. The values of $\mu$ and $\omega$ which solve this equation form a mode with a corresponding $n_{\mathit{eff}}$ given by:

$$n_{\mathit{eff}} = \sqrt{n_1^2 - \left(\frac{u}{k\rho}\right)^2} = \sqrt{n_2^2 + \left(\frac{w}{k\rho}\right)^2}.$$

For a given v parameter, m corresponds to the $m^{th}$ root of the characteristic equation, starting from the highest $n_{\mathit{eff}}$. When v the right hand portion of the equation is zero, and the modes are either $TE_{0,m}$ or $TM_{0,m}$ for solutions of:

$$\left[ \frac{J_v'}{uJ_v} + \frac{K_v'}{wK_v} \right] = 0, \text{ and } \left[ \frac{\varepsilon_1}{\varepsilon_2} \frac{J_v'}{uJ_v} + \frac{K_v'}{wK_v} \right] = 0,$$

respectively. TE modes are odd and TM modes are even. When v>0, there are two sets of solution, positive solutions and negative solutions of the quadratic equation, where positive or negative refers to the sign in from of the square root. $EH_{v,m}$ modes are associated with the positive solutions, and $HE_{v,m}$ modes are associated with the negative solutions.

When $n_1$ is very close to $n_2$, a weakly guiding approximation is used, and it is assumed that:

$$\frac{n_2^2}{n_1^2} \approx 1$$

The characteristic equation becomes:

$$\frac{J_\ell(u)}{uJ_{\ell-1}(u)} = -\frac{K_\ell(w)}{wK_{\ell-1}(w)},$$

which may be solved for LP modes.

Solving modes for multilayered fibers is slightly more complicated, because the $e_z$ and $h_z$ field components are solved for each refractive index interface between layers. For the innermost and outermost layers, there are only two independent variables. For the innermost layer, the solution is either a function of $J_v$ or $I_v$. For the outermost layer, the cladding, the solution is a function of $K_v$ only, assuming that $n_{\mathit{eff}}$ is higher than n of the cladding. For the other layers, the four parameters A, B, A', and B' are independent, and solutions are linear combinations of $J_v$ and $Y_v$, or $I_v$ and $K_v$. Thus, the number of independent parameters to be found is 2 for the center, 2 for the cladding, and 4(N−2) for the intermediate layers where N is the number of layers of the fiber, for a total of 4(N−1) parameters. For the N−2 intermediate nodes there are four equations to find four unknowns. These equations stem from the continuity of $e_z$, $h_z$, $e_\phi$, and $h_\phi$ field components at the interfaces between two adjacent layers.

One technique for solving these equations is the layer-by-layer method. Beginning at the center of the fiber, it is assumed that constants A and A' of the first layer are 1 and α, respectively. The field continuity condition is used to solve for A, B, A', and B' for the next layer, as a function of 1 and α. This is performed for each layer. There is a 4×4 linear system to solve for each layer. At the last layer, it is determined whether a solution for α exists which ensures the continuity of the fields, corresponding to verifying that the determinant of a 2×2 matrix is equal to zero. If the condition is not met, another value of $n_{eff}$ is used.

Graded index fibers may also be solved numerically. The values of $e_z$ and $h_z$ are not expressed using Bessel functions, but as second order coupled differential equations, which may be transformed to four first-order coupled differential equations, which may be solved using the fourth-order Runge-Kutta method. This may be performed for each layer using the layer-by-layer method.

OAM modes are not eigenmodes of optical fibers. However, OAM modes may be built from linear combinations of vector modes. Thus, optical fibers may support OAM modes.

Field components are given by expressions of the form:

$$u(r,\phi) = u_0(r)\xi(\phi),$$

where u is any component of the electric or magnetic field, and $\xi(\phi)$ is a sine or cosine function based on the component of the field and whether the mode is even or odd. From Euler's identity:

$$u(r,\phi)^{even} + ju(r,\phi)^{odd} = u_0(r)e^{\pm jv\phi},$$

where the imaginary number j corresponds to a π/2 phase difference between the even and odd fields. Thus, any combination of even and odd degeneracy of a given mode with a π/2 phase difference leads to a mode with a total angular momentum of v. This total angular momentum is the sum of SAM σ and OAM l. The combination of HE modes gives a circular polarization with the same direction of rotation as the orbital angular momentum, while the combination of EH modes gives a circular polarization with a direction of rotation opposed to the direction of the orbital angular momentum. That is:

$$OAM_{m-1,\pm\ell}^{\pm\sigma} = (\hat{x} \pm j\sigma\hat{y})\vec{F}(r)e^{\pm j\ell\phi} = \begin{cases} HE_{\ell+1,m}^{even} \pm jHE_{\ell+1,m}^{odd}, & \sigma = \pm 1 \\ EH_{\ell-1,m}^{even} \pm jEH_{\ell-1,m}^{odd}, & \sigma = \mp 1 \end{cases},$$

where $\hat{x}$ and $\hat{y}$ are unit vectors and $\vec{F}(r)$ is the radial dependence of either the electrical or magnetic field.

OAM modes may be laser modes in free-space or fiber modes. OAM modes cannot be built from $HE_{1,m}$, because l=0 and:

$$HE_{1,m}^{even} \pm jHE_{1,m}^{odd} = OAM_{m-1,0}^{\pm}.$$

The resulting mode only has a circular polarization. The combination of TM and TE modes gives a total angular momentum of zero, but leads to an unstable vortex, because these modes have different propagation constants, and:

$$TM_{0,m} \pm jTE_{0,m} = OAM_{m-1,\pm 1}^{\mp},$$

$HE_{v,m}$ modes are the basis of $OAM_{m-1,v-1}$ modes, with a circular polarization in the same direction as the field rotation, while $EH_{v,m}$ modes are the basis of $OAM_{m-1,v+1}$ modes with a circular polarization in the opposite direction than the field rotation. This is summarized by:

$$OAM_{p,\pm l}^{\pm} = HE_{l+1,p+1}^{even} \pm jHE_{l+1,p+1}^{odd}$$

$$OAM_{p,\pm l}^{\mp} = EH_{l-1,p+1}^{even} \pm jEH_{l-1,p+1}^{odd},$$

where the sign of the superscript denotes the direction of the circular polarization and the sign of l denotes the direction of field rotation. OAM modes made from HE modes have their polarization and direction of rotation in the same direction, while OAM modes made from EH modes have their polarization and direction of rotation in the opposite direction. $HE_{l+1,m}$ and $EH_{l-1,m}$ are eigenmodes for $LP_{l,m}$ modes. The first OAM mode is built from $HE_{2,1}$, and has a circular polarization in the same direction as the orbital angular momentum with:

$$HE_{2,m}^{even} \pm jHE_{2,m}^{odd} = OAM_{m-1,\pm 1}^{\pm}.$$

Higher OAM modes exist with four variants, two circular polarizations and two OAM directions. Table 1 illustrates the four degeneracies of OAM modes. The number of supported modes includes all degeneracies in polarization and direction of rotation of the phase front of the fields. The two $OAM_{p,0}$ modes are the $HE_{1,p+1}$ modes with left and right circular polarization. The two $OAM_{p,1}$ modes have the same direction of circular polarization and rotation. Higher order OAM modes yield four independent channels, because they have polarization and rotation in the same or in opposite directions.

TABLE 1

| | Counterclockwise Polarization | Clockwise Polarization |
| --- | --- | --- |
| Counterclockwise Phase Rotation | $OAM^-_{p,-|l|}$ | $OAM^+_{p,-|l|}$ |
| Clockwise Phase Rotation | $OAM^-_{p,+|l|}$ | $OAM^+_{p,+|l|}$ |

These equations are solved for the propagation constant β of the guided modes in a fiber. The propagation constant β and the effective index $n_{eff}$ are directly related. From β, the dispersion and propagation of the made are calculated, including non-linear effects, using a variant of the non-linear Schrödinger equation. This applies to vector modes, and thus also to OAM modes. When there is interaction between the modes during propagation, the model may also consider mode coupling.

Mode coupling largely stems from irregularities in the fiber, and may be caused by diameter variations, loss, and isolated particles. Fiber micro and macro bends are also a source of mode coupling. Strong coupling occurs between modes with similar propagation constants, while weak coupling occurs between modes with propagation constant differences greater than a threshold. There are statistical models for crosstalk in multicore fibers. Modal dispersion may be considered as a higher order generalized form of polarization mode dispersion. In WDM systems, there may be coupling between different wavelengths caused by non-linear effects. There are two kinds of intra-modal coupling: crosstalk and multi-path interference (MPI). Crosstalk is more generic, and refers to the amount of power which leaks from a given mode to other modes. Crosstalk may occur at the multiplexing and demultiplexing levels, as well as during transmission. Multi-path interference is more specific, and refers to power which goes back and forth from one mode to other modes. Other impairments may occur during transmission, such as losses, for example bending losses. A model may be used for bending loss in few mode fibers. Also, simulation on how twisted fiber interacts with the generation and propagation of OAM modes may be used.

A model is developed to describe OAM modes propagating in an optical fiber. The model includes coupling between the laser source and the optical fiber, propagation of OAM modes, and intra-modal coupling. Laser modes and fiber modes have different characteristics. When a free-space OAM beam enters a fiber, there is a transient regime where part of the energy is converted to the OAM mode and transmitted through the fiber, and part of the energy is radiated out of the fiber. It is also possible that part of the energy is converted into other fiber modes. The model estimates crosstalk and losses induced by the coupling between the laser beam and fiber, as a function of the incident beam geometry and fiber geometry.

For a given fiber profile at a given wavelength, the supported vector modes are calculated. The refractive index of a layer may be a fixed index or a material, where the refractive index is a function of the wavelength. Example materials include silica, air, silica doped with germanium ($SiO_2GeO_2$), or silica doped with fluorine ($Si_2F$). The dopant concentration may be varied. For silica, the refractive index is calculated using the Sellmeier equation, while for doped silica, the refractive index is calculated using the Classius-Mossotti equation. Software also calculates the refractive index difference with a reference layer, and the numerical aperture relative to the next layer. The inner radius, outer radius, and/or width of the layer may be entered by a user. There may be graded profiles modeled using small steps. The fiber profile is plotted.

Fiber modes may be solved for a range of wavelengths, as well as a range of v values. When the mode is solved, the list of solved wavelengths is displayed, along with the name of the mode, the effective index of the mode, the distance to the nearest mode, and the dispersion parameter.

The whole algorithm is considered as the characteristic equation of the fiber. To find the zeros of this function, the range is divided into small refractive index intervals, and the function is evaluated for those indices, and changes in sign are examined. When an interval where the sign changes is found, the Brent algorithm is used to find the position of the zero in this interval. Additional testing is performed to determine that the found zero is a zero, not a discontinuity. Multiple calculations may be performed in parallel.

For each solved mode, the electrical and magnetic fields may be plotted. The plots represent a component of the field, either in cylindrical coordinates or Cartesian coordinates. The Poynting vector may also be plotted. Additionally, the phase and intensity of the OAM mode may be plotted.

To perform optimization, a wavelength is selected for optimization. Then, parameters, such as radius and refractive index, are swept over. After the sweep over is performed, the results are displayed with the mode separation between the nearest modes, the number of supported vector modes, the number of modes with a mode separation greater than $10^{-4}$, and the average mode separation. Then, it may be solved for the new fiber profile over a range of wavelengths.

From the calculated vector modes, the OAM modes may be calculated. Also, intrinsic parameters, such as effective index of the modes, propagation constants, mode confinements, dispersion parameter, non-linear parameter, etc. may be calculated. The intrinsic parameters are put in relation with extrinsic parameters, such as fiber bend radius and statistical parameters, to simulate mode coupling and losses.

To transmit OAM modes, it is desirable that eigenmodes not easily couple to each other to form LP modes. A mode index separation of $10^{-4}$ may be sufficient to prevent this coupling. It may also be desirable for the fiber profile to mimic the distribution of the mode intensity.

Silica cladding has a refractive index of 1.457 at 633 nm. The fiber numerical aperture (NA) may be less than 0.4, because, when the $GeO_2$ concentration in the doped region is too high, the preform may break. A NA of, for example, around 0.3 may be used. The refractive index of the doped region may be about 0.03 to 0.04 higher than the refractive index of the cladding. Also, when the region is doped with F to obtain a refractive index lower than the cladding, the minimum difference in refractive index between the doped region and silica may be −0.005.

In designing a fiber, first a simple fiber profile is designed. Then complexity is added, step by step. Optimization is performed by slowly varying the diameter of the layers by small increments, and observing the number of supported modes, and average and maximum mode index separation.

It is desirable to have a fiber with multiple OAM modes with a large mode effective index separation. For example, the fiber may support at least 16 modes in the C-band (1530 nm-1565 nm) with a mode index separation of at least $10^{-4}$. In the design, there may be a margin to account for margins in layer diameters and refractive indices and the smoothness of layer edges. Also, when the effective index of the mode is close to the index of the cladding, the mode is sensitive to fiber bends and imperfections.

The number of supported modes may be adjusted by varying the diameter and the refractive index of the region of the fiber where the modes are located. A fiber with a higher refractive index contrast or a larger fiber layer supports more modes.

The mode separation is affected by the refractive index contrast between the fiber layers. The LP modes are present in the weakly guiding approximation, where the refractive indices of the core and cladding are usually different. Thus, a higher refractive index contrast prevents LP modes, leading to a greater mode index separation.

The width of the doped region in the fiber is adjusted to adjust the number of supported vector modes to have fewer modes with a wider spacing. An external layer material having a refractive index lower than the cladding is added to increase the contrast of the refractive indices and limit the number of higher order modes.

The number of supported modes also affects the mode index separation, because the higher the number of supported modes, the greater the chances of having modes with similar effective indices, even between vector modes belonging to different LP modes.

Figure 13:
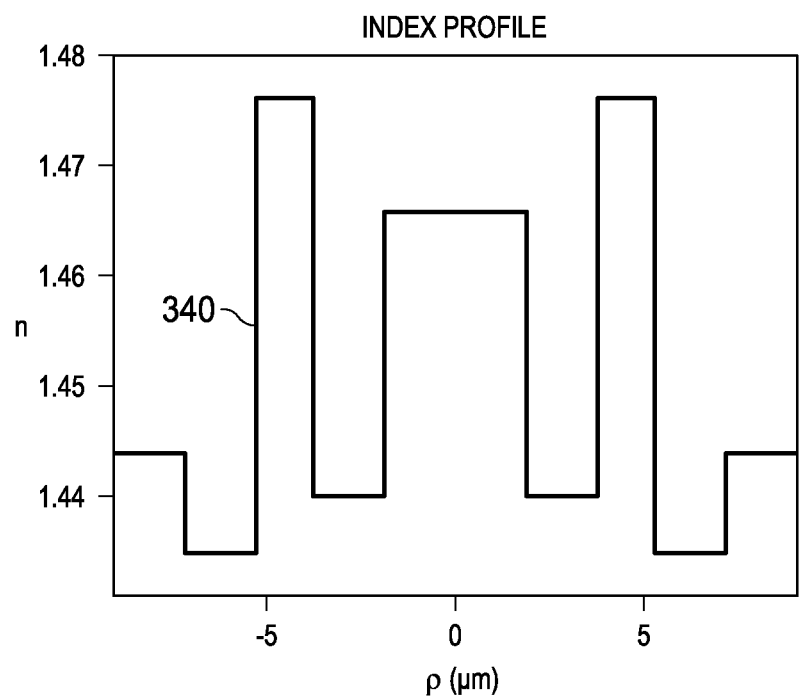
FIG. 13 illustrates an embodiment optical fiber profile.

A vortex fiber is characterized by a central core and an outer ring. The modes with l=0 are Gaussian, which is good for coupling efficiency to a laser beam. FIG. 13 illustrates index profile 340 for a vortex like fiber. Table 2 illustrates the characteristics of the layers of the vortex like fiber, including the outer diameter $\phi$, outer radius $\rho$, layer width $\Delta\rho$, refractive index n, and refractive index relative to the cladding $\Delta n$.

TABLE 2

| $\phi$ (µm) | $\rho$ (µm) | $\Delta\rho$ (µm) | n | $\Delta n$ |
|---|---|---|---|---|
| 3.60 | 1.80 | 1.80 | 1.466 | +0.022 |
| 7.78 | 3.89 | 2.09 | 1.440 | −0.004 |
| 10.38 | 5.19 | 1.30 | 1.476 | +0.032 |

TABLE 2-continued

| φ (μm) | ρ (μm) | Δρ (μm) | n | Δn |
|---|---|---|---|---|
| 14.52 | 7.26 | 2.07 | 1.435 | −0.009 |
| 125.00 | 62.5 | 55.24 | 1.444 | 0.000 |

Figure 14:
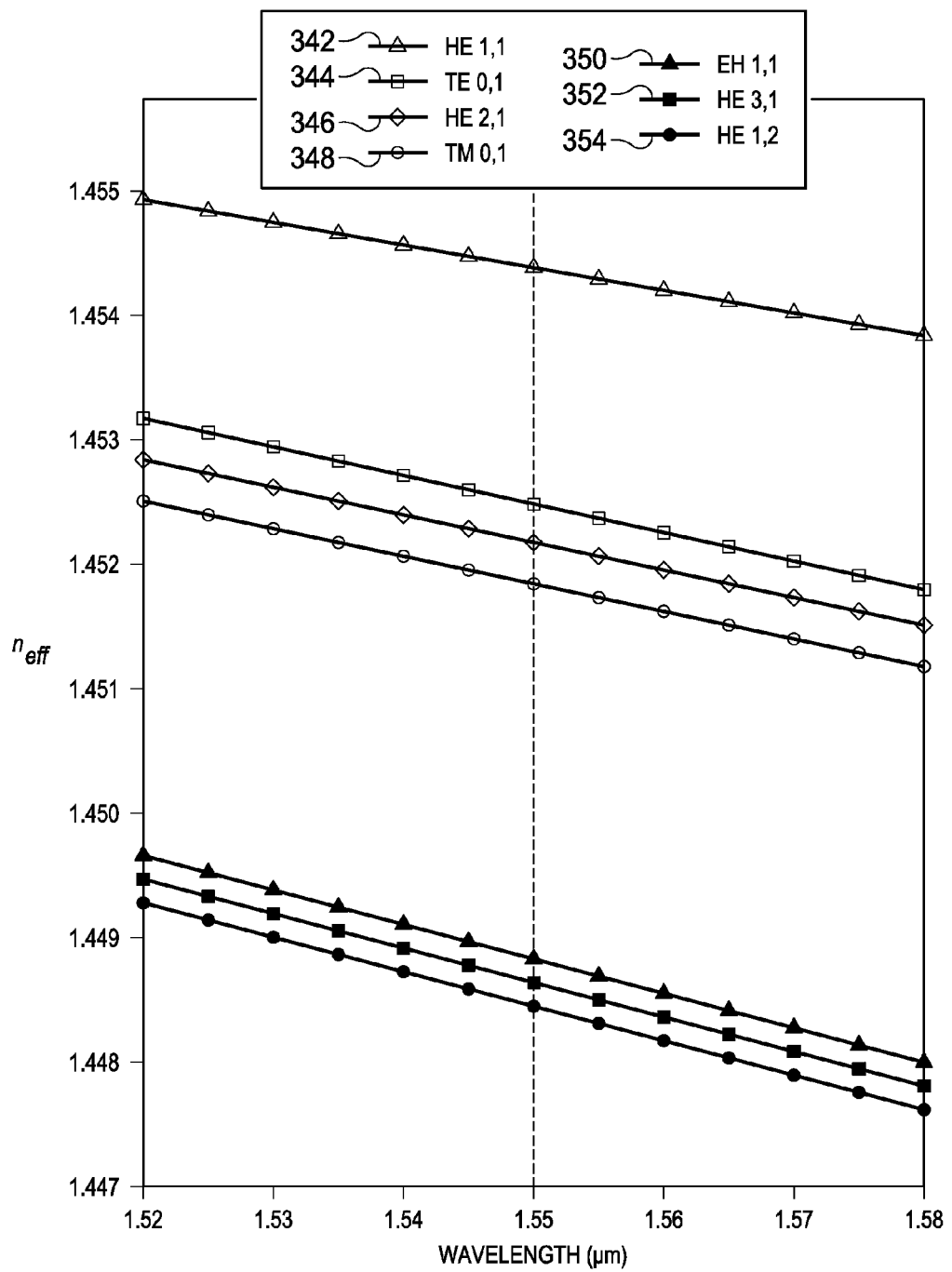
FIG. 14 illustrates a graph of effective index versus wavelength for modes in an embodiment optical fiber.

FIG. 14 illustrates a graph of mode indices over the C-band. Curve 342 shows the effective refractive index for mode $HE_{1,1}$, curve 344 shows the effective refractive index for mode $TE_{0,1}$, curve 346 shows the effective refractive index for mode $HE_{2,1}$, curve 348 shows the effective refractive index for mode $TM_{0,1}$, curve 350 shows the effective refractive index for mode $EH_{1,1}$, curve 352 shows the effective refractive index for mode $HE_{3,1}$, and curve 354 shows the effective refractive index for mode $HE_{1,2}$. Table 3 illustrates the effective refractive index and the difference between the effective index of the nearest mode for the modes in the vortex-like fiber. This fiber potentially supports 10 OAM modes with mode separation of at least $1.96 \cdot 10^{-4}$.

TABLE 3

| Mode | $n_{eff}$ | $\Delta n_{eff}$ |
|---|---|---|
| $HE_{1,1}$ | 1.4544 | $1.93 \cdot 10^{-3}$ |
| $TE_{0,1}$ | 1.4525 | $2.84 \cdot 10^{-4}$ |
| $HE_{2,1}$ | 1.4522 | $2.84 \cdot 10^{-4}$ |
| $TM_{0,1}$ | 1.4518 | $3.34 \cdot 10^{-4}$ |
| $EH_{0,1}$ | 1.4488 | $1.99 \cdot 10^{-4}$ |
| $HE_{3,1}$ | 1.4486 | $1.96 \cdot 10^{-4}$ |
| $HE_{1,2}$ | 1.4484 | $1.96 \cdot 10^{-4}$ |

Figure 15:
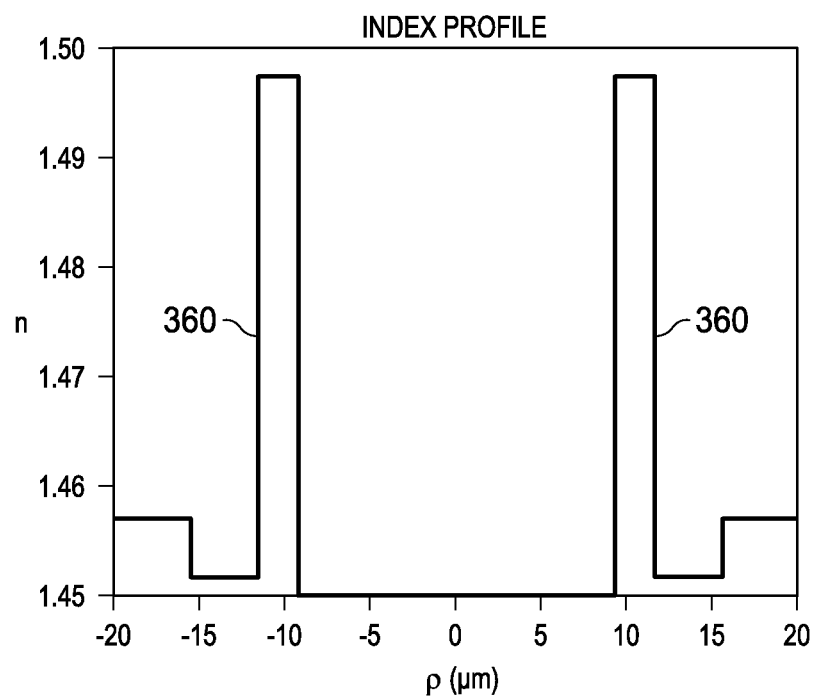
FIG. 15 illustrates the profile of another embodiment optical fiber.

A hollow core fiber has a high index contrast, because the refractive index of air is 1. An embodiment air core ring fiber supports relatively few well separated modes. FIG. 15 illustrates profile 360 for a hollow core fiber. This fiber may support 40 OAM modes, up to $OAM_{0, \mp 10}^{\mp}$ with a mode index separation of at least $1.07 \cdot 10^4$. Table 4 shows the outer later diameter, outer radius, layer width, refractive index, and refractive index relative to the cladding.

TABLE 4

| φ (μm) | ρ (μm) | Δρ (μm) | n | Δn |
|---|---|---|---|---|
| 18.40 | 9.20 | 9.20 | 1.000 | −0.457 |
| 23.20 | 11.60 | 2.40 | 1.498 | +0.041 |
| 31.20 | 15.60 | 4.00 | 1.452 | −0.005 |
| 125.0 | 62.50 | 46.90 | 1.457 | 0.000 |

Figure 16:
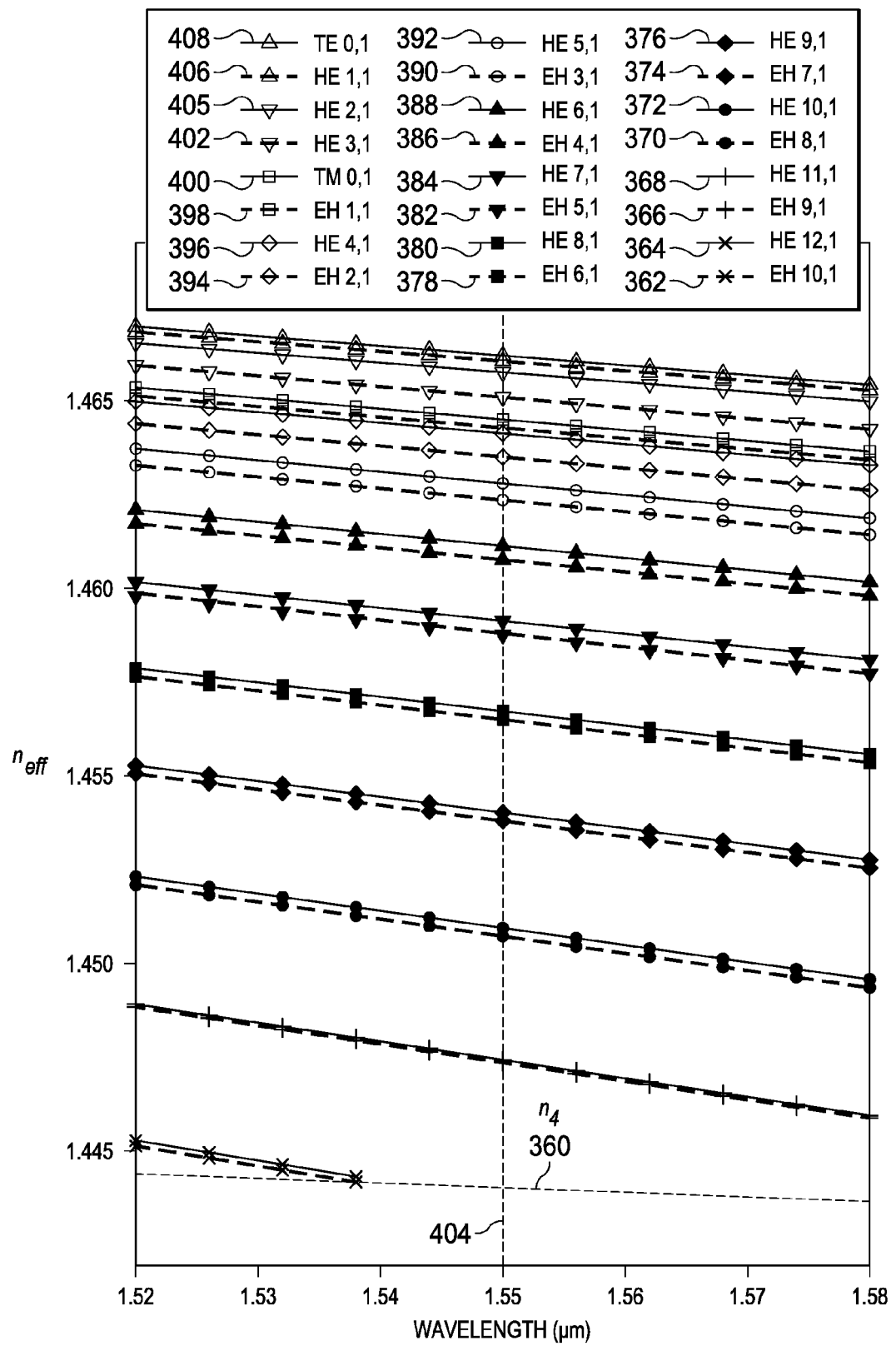
FIG. 16 illustrates a graph of effective index versus wavelength for modes in an embodiment optical fiber.

FIG. 16 illustrates a graph of effective index verses wavelength, where line 404 is 1.55 μm and curve 360 is the refractive index of the cladding. Curve 362 shows the effective refractive index for mode $EH_{10,1}$, curve 364 shows the effective refractive index for mode $HE_{12,1}$, curve 366 shows the effective refractive index for mode $EH_{9,1}$, curve 368 shows the effective index for mode $HE_{11,1}$, curve 370 shows the effective refractive index for mode $EH_{8,1}$, curve 372 shows the effective index for mode $HE_{10,1}$, curve 374 shows the effective index for mode $EH_{7,1}$, curve 376 shows the effective index for mode $HE_{9,1}$, curve 378 shows the effective index for mode $EH_{6,1}$, curve 380 shows the effective index for mode $HE_{8,1}$, curve 382 shows the effective index for mode $EH_{5,1}$, curve 384 shows the effective index for mode $HE_{7,1}$, curve 386 shows the effective index for mode $EH_{4,1}$, curve 388 shows the effective index for mode $HE_{6,1}$, curve 390 shows the effective index for mode $EH_{3,1}$, curve 392 shows the effective index for mode $HE_{5,1}$, curve 394 shows the effective index for mode $EH_{2,1}$, curve 396 shows the effective index for mode $HE_{4,1}$, curve 398 shows the effective index for mode $EH_{1,1}$, curve 400 shows the effective index for mode $TM_{0,1}$, curve 402 shows the effective index for mode $HE_{3,1}$, curve 405 shows the effective refractive index for mode $HE_{2,1}$, curve 406 shows the effective index for mode $HE_{1,1}$, and curve 408 shows the effective index for mode $TE_{0,1}$. The fundamental mode is $TE_{0,1}$.

An embodiment air core ring fiber supports 16 OAM modes. Other embodiments may support 40 OAM modes with a minimum mode index separation of $1.07 \cdot 10^{-4}$. The mode effective indices of $TE_{0,1}$ and $TM_{0,1}$ are so well separated from $HE_{2,1}$ that the mode effective index of $TE_{0,1}$ is closer to $HE_{1,1}$, and the mode effective index of $TM_{0,1}$ falls between $HE_{3,1}$ and $EH_{1,1}$ ($LP_{2,1}$). The supported modes have m=1, because of the thinness of the ring. This simplifies the multiplexing and demultiplexing of the OAM modes, and prevents crosstalk between modes belonging to different families, facilitating good mode separation across the C-band. Also, the ring shape of the fiber profile mimics the intensity profile of the OAM beams and helps the efficiency in the coupling between the free space OAM beams and the fiber. Table 5 illustrates the modes, their effective refractive index, and the minimum refractive index spacing.

TABLE 5

| Mode | $n_{eff}$ | $\Delta n_{eff}$ |
|---|---|---|
| $TE_{0,1}$ | 1.4662 | $1.07 \cdot 10^{-4}$ |
| $HE_{1,1}$ | 1.4661 | $1.07 \cdot 10^{-4}$ |
| $HE_{2,1}$ | 1.4657 | $3.50 \cdot 10^{-4}$ |
| $HE_{3,1}$ | 1.4651 | $5.87 \cdot 10^{-4}$ |
| $TM_{0,1}$ | 1.4645 | $2.56 \cdot 10^{-4}$ |
| $EH_{1,1}$ | 1.4643 | $1.26 \cdot 10^{-4}$ |
| $HE_{4,1}$ | 1.4641 | $1.26 \cdot 10^{-4}$ |
| $EH_{2,1}$ | 1.4635 | $6.13 \cdot 10^{-4}$ |
| $HE_{5,1}$ | 1.4628 | $4.71 \cdot 10^{-4}$ |
| $EH_{3,1}$ | 1.4623 | $4.71 \cdot 10^{-4}$ |
| $HE_{6,1}$ | 1.4612 | $3.76 \cdot 10^{-4}$ |
| $EH_{4,1}$ | 1.4608 | $3.76 \cdot 10^{-4}$ |
| $HE_{7,1}$ | 1.4591 | $3.07 \cdot 10^{-4}$ |
| $EH_{5,1}$ | 1.4588 | $3.07 \cdot 10^{-4}$ |
| $HE_{8,1}$ | 1.4567 | $2.51 \cdot 10^{-4}$ |
| $EH_{6,1}$ | 1.4565 | $2.51 \cdot 10^{-4}$ |
| $HE_{9,1}$ | 1.4540 | $2.02 \cdot 10^{-4}$ |
| $EH_{7,1}$ | 1.4538 | $2.02 \cdot 10^{-4}$ |
| $HE_{10,1}$ | 1.4509 | $1.57 \cdot 10^{-4}$ |
| $EH_{8,1}$ | 1.4507 | $1.57 \cdot 10^{-4}$ |
| $HE_{11,1}$ | 1.4474 | $1.12 \cdot 10^{-4}$ |
| $EH_{9,1}$ | 1.4473 | $1.12 \cdot 10^{-4}$ |

An embodiment optical fiber including a large low refractive index (e.g. hollow) core, surrounded by a thin layer of material with a high refractive index, transmits multiple OAM modes. The high refractive index material is surrounded by another slightly wider layer of material with a low refractive index, all surrounded by silica cladding. The high contrast is introduced between the low refractive index of the core and the high refractive index of the highly doped region to achieve a large discrepancy between the effective indices of the $HE_{l+1,m}$ and $EH_{l-1,m}$ modes. When the inner core is not hollow, it may be silica doped with fluorine to reduce the refractive index. Also, the low refractive index layer may be silica doped with fluorine to reduce the refractive index. In another example, boron trioxide is used to reduce the refractive index. The high refractive index region may be silica doped with germanium to increase the refractive index. In another example, aluminum oxide is added to raise the refractive index. Phosphorous may also be added to the fiber. The spacing in the effective refractive index in the modes is achieved by setting the refractive index of the highly doped area to be high, to increase the contrast between the high refractive index layer and both the core and the low refractive index material.

Modes propagate through the high refractive index layer. The ring shape of this region matches the intensity profile of OAM modes. The number of supported modes is determined by the inner and outer diameter of the high refractive index material, as well as the refractive index of the high refractive index material. Because the effective indices of the modes reside between the refractive index of the cladding and the refractive index of the highly doped layer, increasing the number of supported modes leads to more closely spaced effective refractive indices. Fewer modes are achieved by making the highly doped layer narrower. Also, the narrowness of the high refractive index material removes modes with m>1. Fiber dimensions determine the achievable refractive indices and the number of supported nodes.

A custom air-core ring fiber is fabricated. A fiber preform is fabricated using modified chemical vapor deposition (MCVD) in two steps. First, a layer is formed using $SiO_2$, $P_2O_5$, and F. Then, a ring layer is deposited using $SiO_2$ and $GeO_2$ to produce a step index profile. Finally, the fiber is partially collapsed to produce the glass preform. The tolerance for the radius of the air core is 9.2±0.2 µm, while the tolerance for the high refractive index layer is 2.4±0.2 µm. Also, the tolerance for the low refractive index layer is 4.0 µm or greater. The refractive index for the high refractive index layer is 0.036 to 0.041 higher than the refractive index of the cladding. Other embodiments have different tolerances. For example, when the refractive index of the ring layer is lower, the thickness is adjusted.

Figure 17:
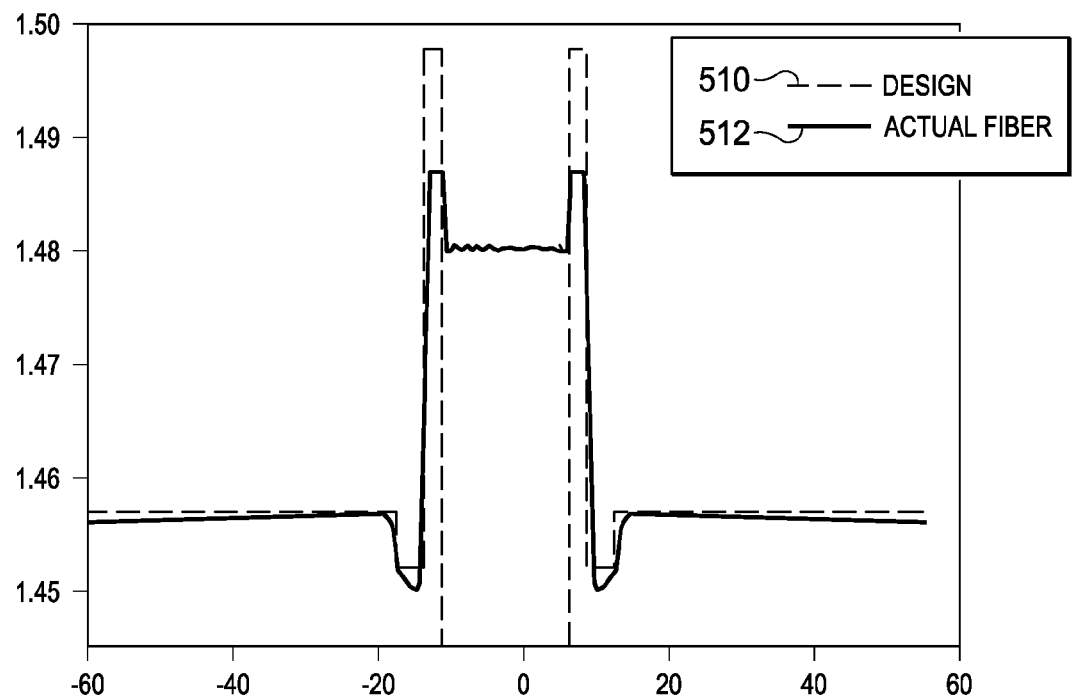
FIG. 17 illustrates a graph of fiber profile for embodiment optical fibers.

FIG. 17 illustrates the refractive index profile of a designed fiber in curve 510 and the refractive index profile of a fabricated fiber in curve 512. The non-zero air core refractive index measurement is an artifact from the measurement technique. The refractive index of oil which seeps into the air core, rather than the refractive index of air. The fabricated fiber has a lower refractive index than the designed fiber in the high refractive index region. This is because doping silica to increase its refractive index weakens the glass, making it problematic to achieve a very high refractive index.

Figure 18:
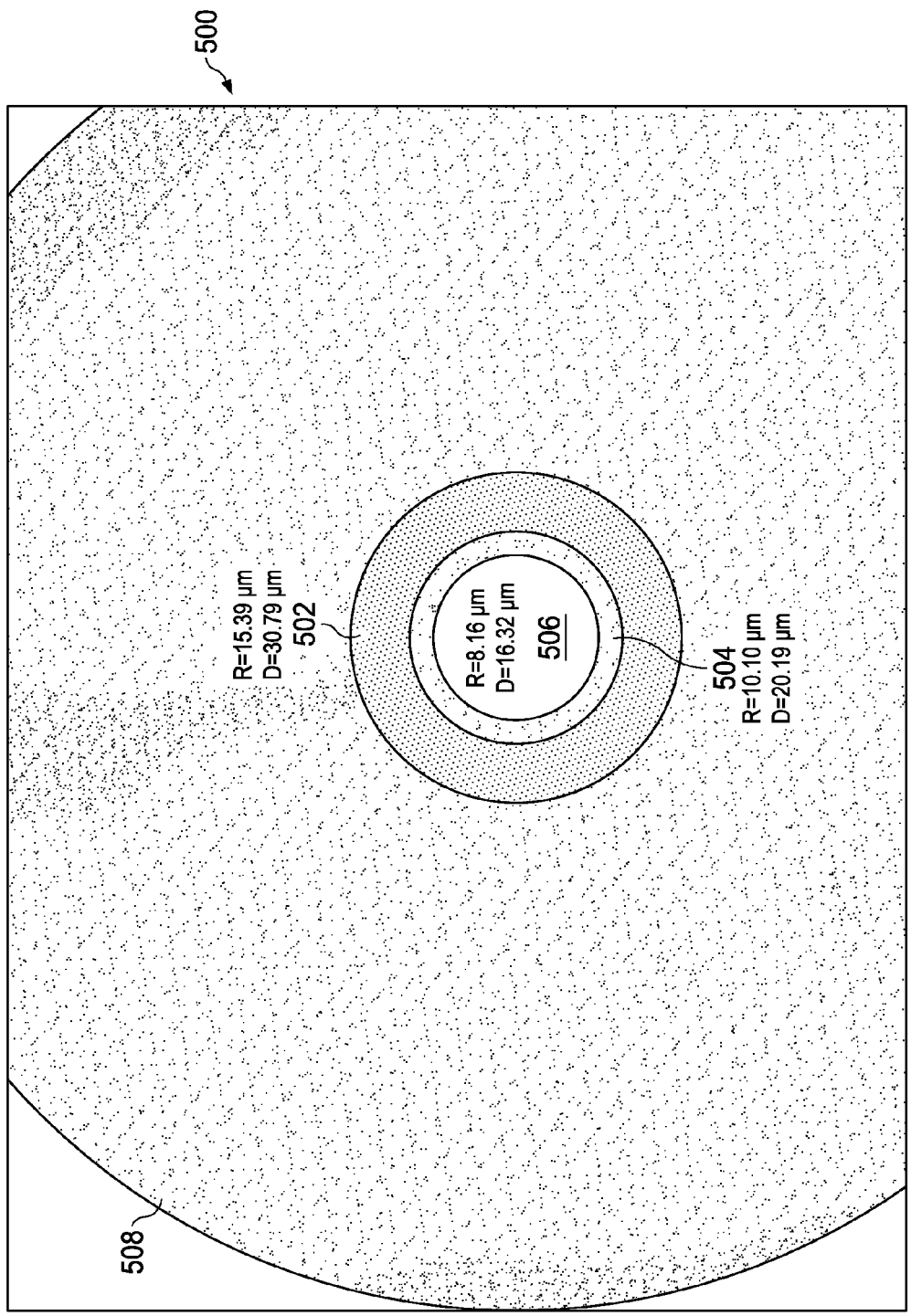
FIG. 18 illustrates an embodiment optical fiber.

FIG. 18 illustrates fiber 500, a fabricated air core ring fiber. Fiber 500 contains air core 506, high refractive index region 504, low refractive index region 502, and cladding 508. Air core 506 has a radius of 8.16 µm and a diameter of 16.32 µm. Low refractive index layer 502 has an inner radius of 10.10 µm and an outer radius of 15.39 µm.

Figure 19:
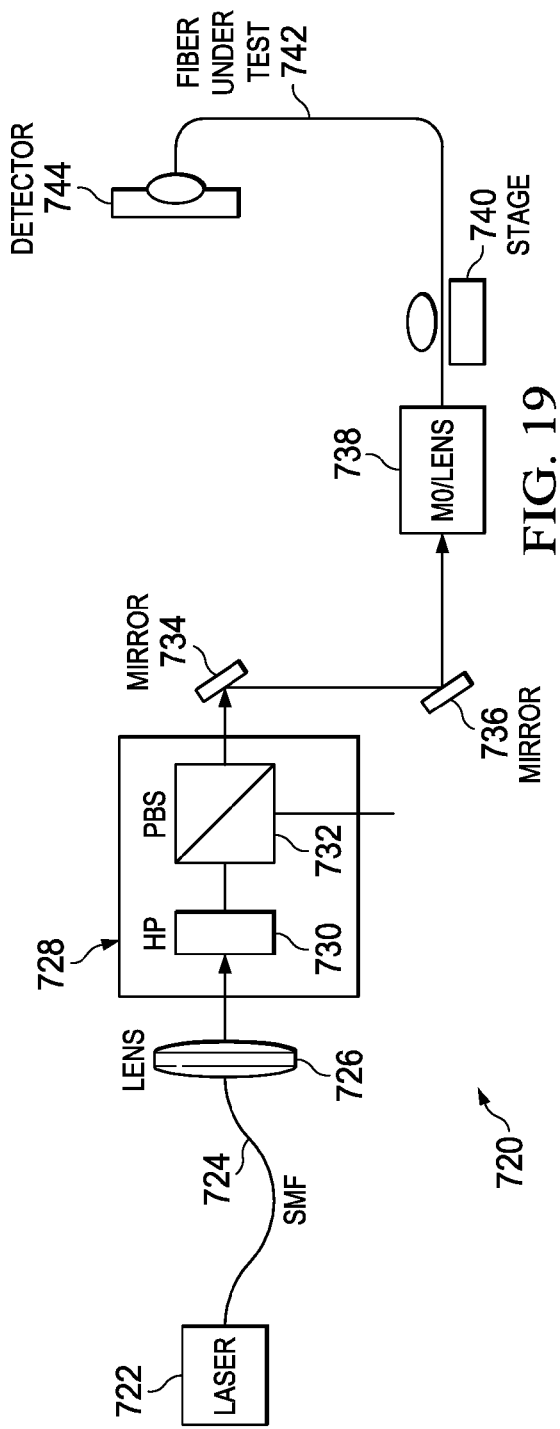
FIG. 19 illustrates a system for testing optical fibers.

Different types of fibers and lenses may be used for free space light coupling into air core ring fibers. Fibers which may be used include single mode fiber, multimode fiber (MMF), and orbital angular momentum fibers. FIG. 19 illustrates system 720 using a SMF to couple light into a test fiber. Laser 722, a continuously tunable laser couples light into SMF 724. Lens 726 converts the light to a free space beam. Power attenuator 728, which contains half wave plate (HP) 730 and polarization beam splitter (PBS) 732, maintains the linear polarization of the light. Mirrors 734 and 736 control the height of the beam from the optical table. The light beam is coupled into fiber 742, the fiber under test, by lens or microscopic objective (MO) 738 through stage 740. The power at the fiber output is monitored by detector 744, a power meter. To form circularly polarized light, a quarter wave plate is placed between the beam splitter and the mirror.

The input power from the laser is 6 dBm. Table 6 below illustrates the characterizations of the three fibers, while table 7 below shows power coupling measurements using a lens, and table 8 shows power coupling measurements using a microscope objective.

TABLE 1

| Fiber | Numerical Aperture | Length | Inner Core Diameter | Outer Core Diameter |
|---|---|---|---|---|
| SMF | 0.14 | 1 m | N/A | 8.2 µm |
| MMF | 0.2 | 2.4 m | N/A | 50 µm |
| OAM | 0.32 | 1 m | 15 µm | 35 µm |

TABLE 2

| Fiber | Length | Polarization | Lens NA | Power at lens output | Power at fiber output |
|---|---|---|---|---|---|
| SMF | 1 m | Linear | 0.3 | 400 µW −4 dBm | 130 µW −8.86 dBm |
| OAM | 1 m | Linear | 0.3 | 400 µW −4 dBm | 30 µW −15.23 dBm |
| OAM | 1 m | Circular | 0.3 | 400 µW −4 dBm | 60 µW −12.22 dBm |

TABLE 3

| Fiber | Length | Polarization | Lens NA | Power at lens output | Power at fiber output |
|---|---|---|---|---|---|
| SMF | 1 m | Linear | 0.17 & 0.65 | ~320 µW −4.95 dBm | 32 µW −14.95 dBm |
| MMF | 2.4 m | Linear | 0.17 & 0.65 | ~320 µW −4.95 dBm | 240 µW −6.2 dBm |
| OAM | 1 m | Circular | 0.17 & 0.65 | ~350 µW −4.56 dBm | 115 µW −9.4 dBm |
| OAM | 1 m | Linear | 0.17 & 0.65 | ~320 µW −4.95 dBm | 105 µW −9.8 dBm |

Figure 20:
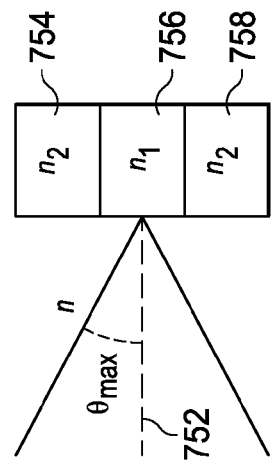
FIG. 20 illustrates determination of numerical aperture for an optical fiber.

The numerical aperture (NA) in a simple fiber is given by:

$$NA=\sqrt{n_1^2-n_2^2}=(n)\sin\theta_{max},$$

where $n_1$ is the refractive index of the core, $n_2$ is the refractive index of the cladding, n is the refractive index of the incident medium, and $\theta_{max}$ is the maximum acceptance half angle. FIG. 20 illustrates a simple fiber with core 756, cladding 754 and 758, and maximum angle 752.

Figure 21:
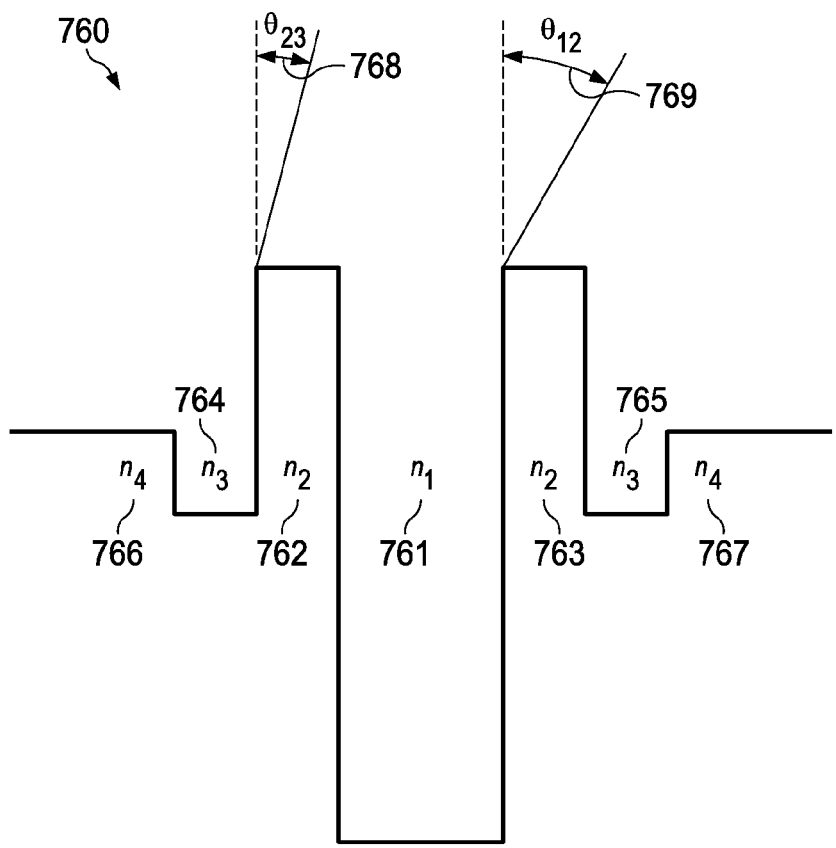
FIG. 21 illustrates determination of numerical aperture for an embodiment optical fiber.

An OAM fiber, illustrated by FIG. 21, has many layers. Fiber 760 has low refractive index core 761, high refractive index regions 762 and 763, low refractive index regions 764 and 765, cladding 766 and 767, and maximum angles 768 and 769. For a supported mode, the intensity of the field is located in high refractive index regions 762 and 763. Thus, rays of light are reflected either at the interface of core 761 ($\theta_{12}$) or low refractive index regions 764 and 765 ($\theta_{23}$), because the refractive index contrast is higher. Thus, the maximum acceptance angle for the fiber is limited by the lowest acceptance angle. The NA is given by:

$$NA=\sqrt{n_3^2-n_2^2}.$$

Figure 22:
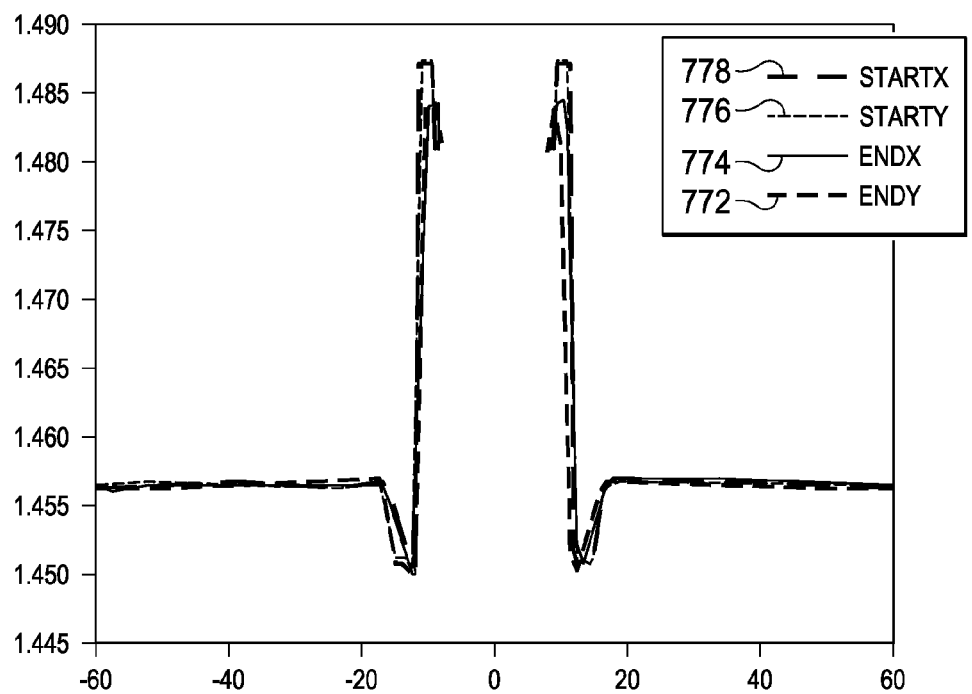
FIG. 22 illustrates measured refractive indices for an embodiment optical fiber.

The characteristics of the OAM fiber are slightly different at its ends. FIG. 22 illustrates a plot of the measured refractive indices on the x and y axis at both ends of the fiber. Curve 778 shows the refractive index at the start of the fiber on the x axis, curve 776 shows the refractive index of the fiber at the start on the y axis, curve 774 shows the refractive index of the fiber at the end on the x axis, and curve 772 shows the refractive index of the fiber at the end on the y axis. The NA is calculated using the maximum value of the indices as $n_2$ and the minimum value as $n_3$. Table 9 shows the NAs. These are the upward bound for the NA. To calculate a lower bound for NA, values from FIG. 22 which are slightly lower than the lowest refractive index in the $n_2$ region and slightly higher than the highest refractive index in the $n_3$ region. Using $n_3=1.483$ and $n_2=1.451$ yields a NA of 0.306.

TABLE 9

| Position | $n_3$ | $n_2$ | NA |
| --- | --- | --- | --- |
| Start x axis | 1.48692 | 1.45074 | 0.326 |
| Start y axis | 1.48712 | 1.45006 | 0.330 |
| End x axis | 1.48421 | 1.44995 | 0.317 |
| End y axis | 1.48406 | 1.45040 | 0.314 |

Figure 23:
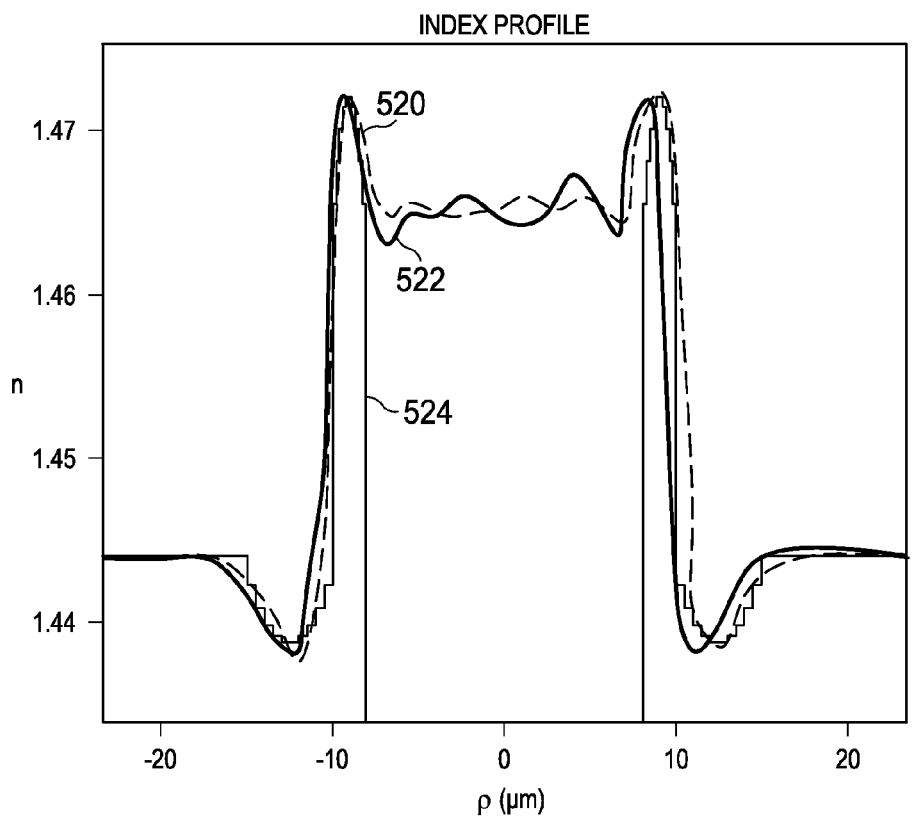
FIG. 23 illustrates a graph of refractive indices for embodiment optical fibers.

An embodiment fiber supports 16 OAM modes, up to $OAM_{0,\pm4}^{\pm}$, with a minimum mode index separation of $1.12 \cdot 10^{-4}$. FIG. 23 illustrates the measured refractive index on the x-axis (curve 520) and the measured refractive index on the y-axis (curve 522). Curve 524 shows the refractive index from a simulation. Table 10 shows the outer diameter, outer radius, layer width, refractive index, and refractive index difference relative to the cladding for the fiber.

TABLE 10

| φ (μm) | ρ (μm) | Δρ (μm) | n | Δn |
| --- | --- | --- | --- | --- |
| 16.2 | 8.10 | 8.10 | 1.000 | −0.444 |
| 20.00 | 10.00 | 1.90 | 1.472 | +0.028 |
| 30.00 | 15.00 | 5.00 | 1.139 | −0.005 |
| 125.0 | 62.50 | 47.50 | 1.444 | 0.000 |

Figure 24:
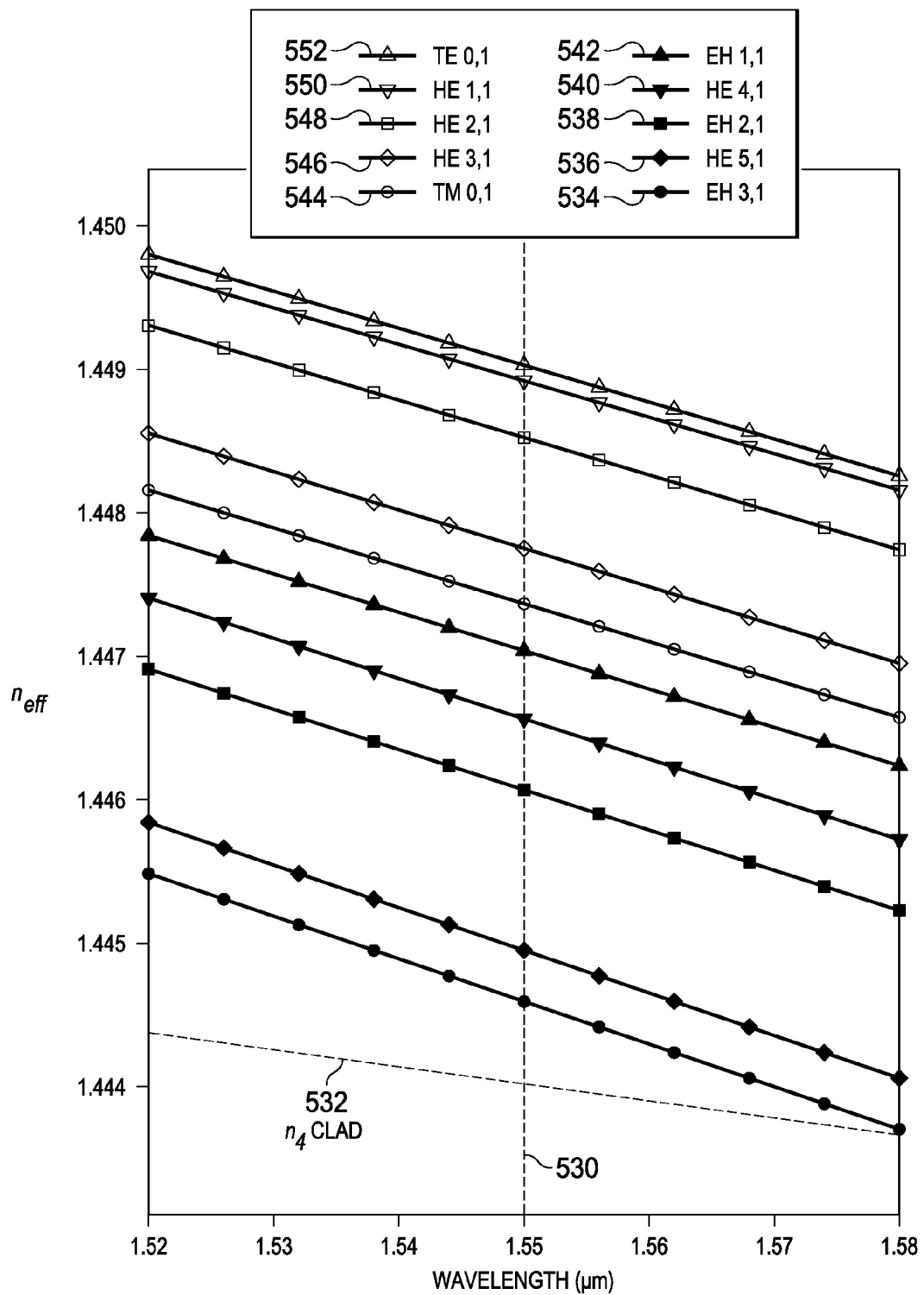
FIG. 24 illustrates a graph of effective index versus wavelength of modes in an embodiment optical fiber.

An embodiment fiber experiences good separation between the effective refractive indices. At 1550 nm, the closest modes are $TE_{0,1}$ and $HE_{1,1}$, which have a separation of $1.1 \cdot 10^{-4}$. FIG. 24 illustrates a graph of the modes in the fiber. Line 530 shows 1.55 μm. Curve 532 shows $n_4$, the refractive index of the cladding, curve 534 shows mode $EH_{3,1}$, curve 536 shows mode $HE_{5,1}$, curve 538 shows mode $EH_{2,1}$, curve 540 shows mode $HE_{4,1}$, curve 542 shows mode $EH_{1,1}$, curve 544 shows mode $TM_{0,1}$, curve 546 shows mode $HE_{3,1}$, curve 548 shows mode $HE_{2,1}$, curve 550 shows mode $HE_{1,1}$, and curve 552 shows mode $TE_{0,1}$. Table 11 shows the refractive index and refractive index separation for modes in the fiber. Because all the vector modes except the TE and TM modes may be the basis of two OAM modes, one with clockwise rotation and one with counterclockwise rotation, the fiber may support 16 OAM modes. Furthermore, the effective index separation is high, leading to little intermodal coupling.

TABLE 11

| Mode | $n_{eff}$ | $\Delta n_{eff}$ |
| --- | --- | --- |
| $TE_{0,1}$ | 1.4490 | $1.12 \cdot 10^{-4}$ |
| $HE_{1,1}$ | 1.4489 | $1.12 \cdot 10^{-4}$ |
| $HE_{2,1}$ | 1.4485 | $3.99 \cdot 10^{-4}$ |
| $HE_{3,1}$ | 1.4477 | $3.83 \cdot 10^{-4}$ |
| $TM_{0,1}$ | 1.4474 | $3.38 \cdot 10^{-4}$ |
| $EH_{1,1}$ | 1.4470 | $3.38 \cdot 10^{-4}$ |
| $HE_{4,1}$ | 1.4466 | $4.62 \cdot 10^{-4}$ |
| $EH_{2,1}$ | 1.4461 | $4.89 \cdot 10^{-4}$ |
| $HE_{5,1}$ | 1.4449 | $3.52 \cdot 10^{-4}$ |
| $EH_{3,1}$ | 1.4446 | $3.52 \cdot 10^{-4}$ |

Figure 25:
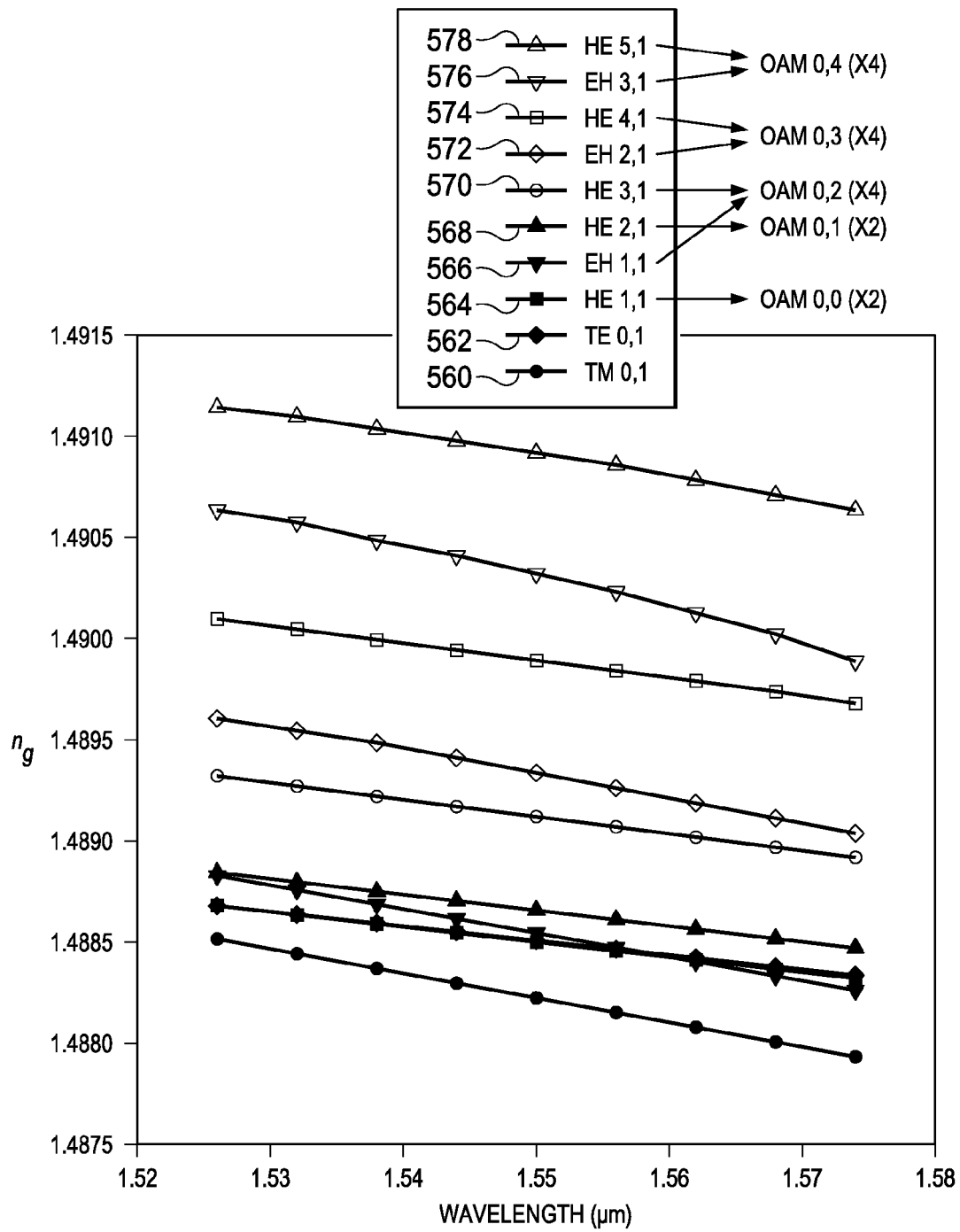
FIG. 25 illustrates a graph of group index versus wavelength for modes in an embodiment optical fiber.

FIG. 25 illustrates a graph of group index verses wavelength for modes in an embodiment air core ring fiber. Curve 560 shows the group index for mode $TM_{0,1}$ and curve 562 shows the group index for $TE_{0,1}$ mode. Curve 564 shows the group index for $HE_{1,1}$, which are two $OAM_{0,0}$ modes. Also, curve 568 shows the group index for mode $HE_{2,1}$, which are two $OAM_{0,1}$ modes. Curve 566 shows mode $EH_{1,1}$ and curve 570 shows the group index for mode $HE_{3,1}$, which are four $OAM_{0,2}$ modes. Additionally, curve 572 shows the group index for mode $EH_{2,1}$ and curve 574 shows the group index for $HE_{4,1}$, which are four $OAM_{0,3}$ modes. Curve 576 shows the group index for mode $EH_{3,1}$ and curve 578 shows the group index for mode $HE_{5,1}$, which are $OAM_{0,4}$, four modes. The OAM modes with higher topological charge may propagate slower than OAM modes with lower topological charge. Also, among OAM modes with the same topological charge, the modes with polarization in the same direction as the rotation propagate slower than the modes with polarization in the opposite direction as the rotation.

Figure 26:
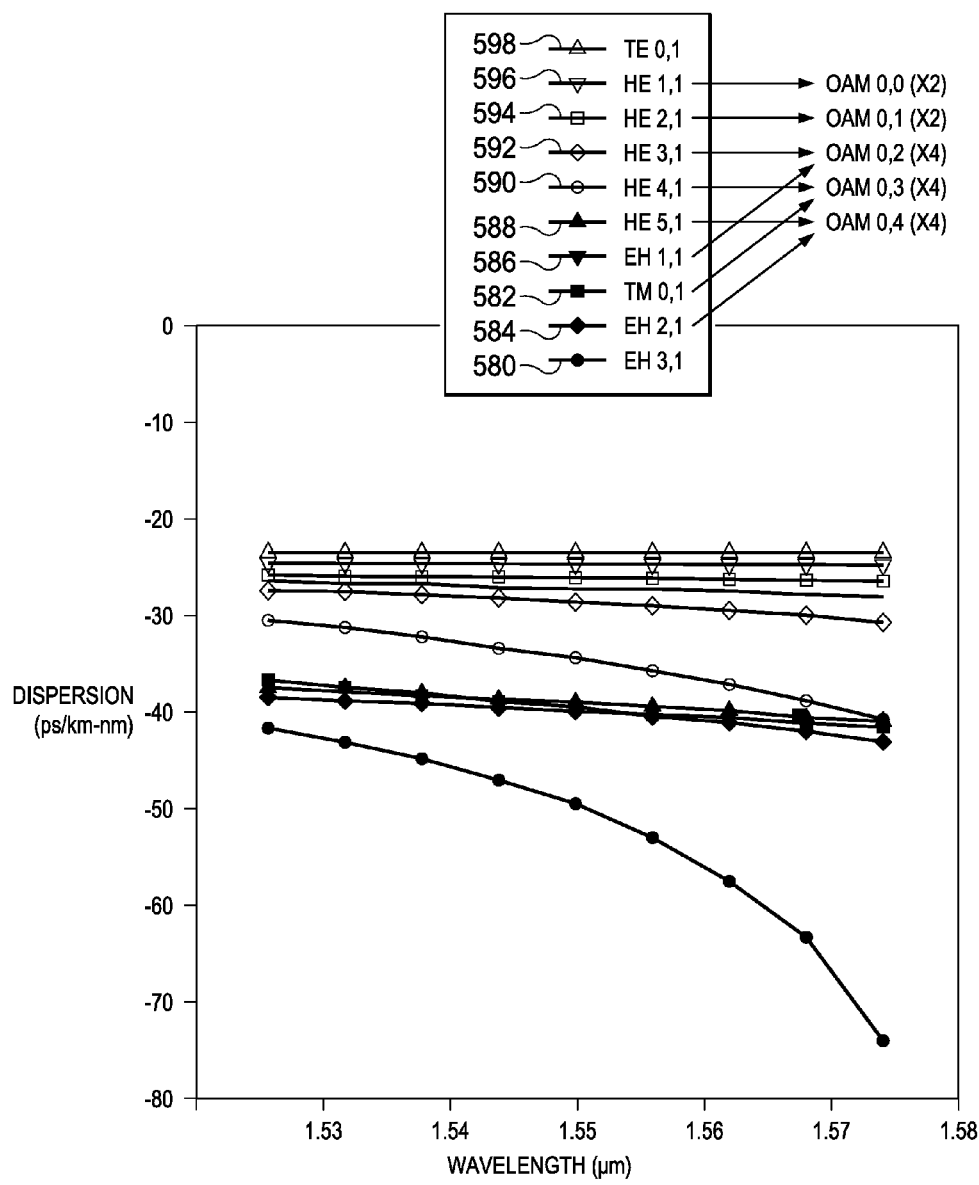
FIG. 26 illustrates a graph of dispersion verses wavelength for modes in an embodiment optical fiber.

FIG. 26 shows the simulated dispersion versus wavelength for the modes in an embodiment air core ring fiber. Curve 580 shows the dispersion for mode $EH_{3,1}$, and curve 588 shows the dispersion for mode $HE_{5,1}$, which are four $OAM_{0,4}$ modes. Also, curve 582 shows the dispersion for mode $EH_{2,1}$, and curve 590 shows the dispersion for mode $HE_{4,1}$, four $OAM_{0,3}$ modes. Additionally, curve 584 shows the dispersion for mode $TM_{0,1}$ and curve 598 shows the dispersion for mode $TE_{0,1}$. Curve 586 shows the dispersion for mode $EH_{1,1}$, and curve 592 shows the dispersion for mode $HE_{3,1}$, four $OAM_{0,2}$ modes. Also, curve 594 shows the dispersion for mode $HE_{2,1}$, two $OAM_{0,1}$ modes, and curve 596 shows the dispersion for mode $HE_{1,1}$, two $OAM_{0,0}$ modes. The dispersion for all of the modes across the C band is negative, because of the profile of the fiber. It is problematic to design a low dispersion fiber, especially across a range of wavelengths. A dispersion compensation system may be used. However, dispersion is not problematic over short distance. Also, the dispersion reduces the risk of nonlinear effects.

The refractive index of an embodiment air core ring fiber is measured using an optical fiber analyzer.

Using an SLM, a laser beam is converted into an OAM beam, coupled into an embodiment air core ring fiber. Then, the signal at the end of the fiber is converted back to free-space, to a Gaussian beam using the SLM, and the output power is recorded. This is done one mode at a time.

The effective index difference between OAM modes is determined at different wavelengths in the C-Band. This may be determined using interferometry.

Then, crosstalk is measured, by generating a single OAM mode. The power of surrounding modes is measured at the receiver. The impact of bends and twists on crosstalk may also be examined.

Figure 27:
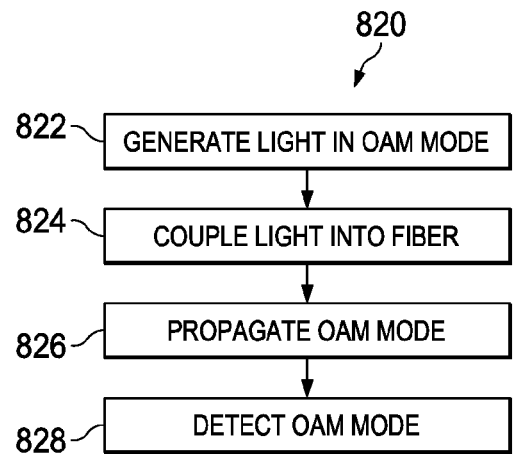
FIG. 27 illustrates a flowchart of an embodiment method of propagating light in an optical fiber.

FIG. 27 illustrates flowchart 820 for a method of transmitting OAM modes in an air core ring optical fiber. In one example, the air core fiber includes a first layer with a low refractive index, for example air, a high refractive index ring layer surrounding the low refractive index layer, a relatively low refractive index layer surrounding the high refractive index layer, and a cladding surrounding the relatively low refractive index layer. Initially, in step 822, the OAM light mode is generated. For example, a Gaussian beam may be generated by a laser, and then converted to an OAM mode in free space. OAM beams may be generated by transforming the phase of a laser beam or a Gaussian beam. The phase transformation may be done through CGH or SPP. Alternatively, PICs are used. In another example, a multicore fiber is used to generate and recover OAM modes. Alternatively, each channel is a separate ring of light into the fiber.

Then, in step 824, the OAM is coupled in the fiber. The OAM mode may be coupled into the fiber using a lens or microscope objective.

Next, in step 826, the OAM mode propagates along the fiber. Many OAM modes may propagate along the fiber with a significant separation between modes.

Finally, in step 828, the transmitted OAM mode is detected. A CCD detector may be used. Alternatively, photodiodes are used. In one example, demultiplexing is performed at the same time as detection. In another example, the OAM modes are demultiplexed and then detected in separate steps. For example, the CGH technique creates spatial separation of the converted modes, and it may be used to convert and demultiplex simultaneously. The OAM beams may be directly detected. Also, OAM beams may be converted to Gaussian beams, for example so a receiver designed for a Gaussian intensity shaper.

An embodiment method of transmitting light includes generating a plurality of OAM modes and coupling the plurality of OAM modes into an optical fiber. The optical fiber includes a first layer having a first refractive index, a second layer surrounding the first layer, where the second layer has a second refractive index, a third layer surrounding the second layer, where the third layer has a third refractive index, and a fourth layer surrounding the third layer, where the fourth layer has a fourth refractive index, where the first refractive index is less than the second refractive index, where the third refractive index is less than the second refractive index, and where the third refractive index is less than the fourth refractive index. The method also includes propagating the plurality of OAM modes along the optical fiber to produce a plurality of propagated OAM modes.

Figure 28:
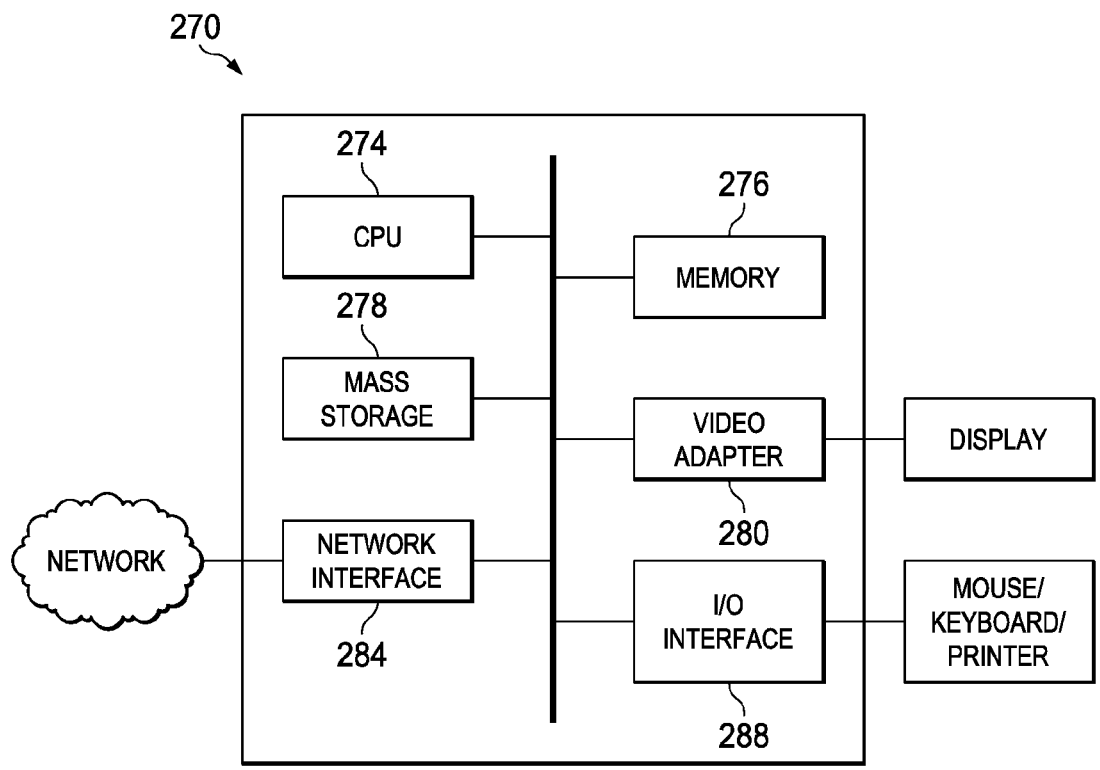
FIG. 28 illustrates a block diagram of an embodiment computer system.

FIG. 28 illustrates a block diagram of processing system 270 that may be used for implementing the devices and methods disclosed herein. For example, a processing system may be used to determine the width and refractive index of rings in an optical fiber. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical fiber comprising:
    a first layer having a first refractive index, wherein the first layer is air;
    a second layer surrounding the first layer, wherein the second layer has a second refractive index, an inner radius, and an outer radius; and
    a third layer surrounding the second layer, wherein the third layer has a third refractive index, wherein the first refractive index is less than the second refractive index, wherein the third refractive index is less than the second refractive index, and wherein a ratio of the outer radius to the inner radius is less than 1.5, wherein the optical fiber supports at least 16 orbital angular momentum (OAM) modes with a mode spacing between all of the at least 16 OAM modes of at least $1 \cdot 10^{-4}$.

2. The optical fiber of claim 1, wherein the first layer has a diameter of between 15 μm and 20 μm.

3. The optical fiber of claim 1, wherein the second layer is germanium doped silica.

4. The optical fiber of claim 1, wherein the ratio of the outer radius to the inner radius is less than 1.3.

5. The optical fiber of claim 1, wherein a width of the second layer is between 2 μm and 3 μm.

6. An optical fiber comprising:
   a first layer having a first refractive index, wherein the first layer is air;
   a second layer surrounding the first layer, wherein the second layer has a second refractive index;
   a third layer surrounding the second layer, wherein the third layer has a third refractive index; and
   a fourth layer surrounding the third layer, wherein the fourth layer has a fourth refractive index, wherein the first refractive index is less than the second refractive index, wherein the third refractive index is less than the second refractive index, and wherein the third refractive index is less than the fourth refractive index.

7. The optical fiber of claim 6, wherein the third layer is fluorine doped silica.

8. The optical fiber of claim 6, wherein the fourth layer is silica.

9. The optical fiber of claim 6, wherein the optical fiber is configured to support at least 16 orbital angular momentum (OAM) modes with a mode spacing of at least $1 \cdot 10^{-4}$.

10. A method of transmitting light, the method comprising:
    generating a plurality of orbital angular momentum (OAM) modes;
    coupling the plurality of OAM modes into an optical fiber, wherein the optical fiber comprises
       a first layer having a first refractive index,
       a second layer surrounding the first layer, wherein the second layer has a second refractive index, an inner radius, and an outer radius, and
       a third layer surrounding the second layer, wherein the third layer has a third refractive index, wherein the first refractive index is less than the second refractive index, wherein the third refractive index is less than the second refractive index, and wherein a ratio of the outer radius to the inner radius is less than 1.5; and
    propagating the plurality of OAM modes along the optical fiber to produce a plurality of propagated OAM modes, wherein propagating the plurality of OAM modes comprises propagating at least 16 OAM modes with a mode spacing between all of the at least 16 OAM modes of at least $1 \cdot 10^{-4}$.

11. The method of claim 10, wherein generating the plurality of OAM modes comprises utilizing a computer generated hologram (CGH).

12. The method of claim 10, wherein generating the plurality of OAM modes comprises utilizing a spiral phase pattern (SPP).

13. The method of claim 10, further comprising demultiplexing the plurality of propagated OAM modes.

14. The method of claim 10, further comprising detecting the plurality of propagated OAM modes.

15. An optical fiber comprising:
    a first layer having a first refractive index;
    a second layer surrounding the first layer, wherein the second layer has a second refractive index;
    a third layer surrounding the second layer, wherein the third layer has a third refractive index; and
    a fourth layer surrounding the third layer, wherein the fourth layer has a fourth refractive index, wherein the first refractive index is less than the second refractive index, wherein the third refractive index is less than the second refractive index, and wherein the third refractive index is less than the fourth refractive index, wherein the optical fiber is configured to support at least 16 orbital angular momentum (OAM) modes with a mode spacing of at least $1 \cdot 10^{-4}$.

16. The optical fiber of claim 15, wherein the third layer is fluorine doped silica.

17. The optical fiber of claim 15, wherein the fourth layer is silica.

* * * * *